(12) United States Patent
Nagatomi

(10) Patent No.: US 8,159,907 B2
(45) Date of Patent: Apr. 17, 2012

(54) OPTICAL PICKUP DEVICE

(75) Inventor: Kenji Nagatomi, Kaizu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/821,529

(22) Filed: Jun. 23, 2010

(65) Prior Publication Data

US 2010/0329102 A1   Dec. 30, 2010

(30) Foreign Application Priority Data

Jun. 25, 2009 (JP) ................................. 2009-150480

(51) Int. Cl.
  *G11B 7/135* (2012.01)
(52) U.S. Cl. ............ 369/44.23; 369/112.06; 369/112.25
(58) Field of Classification Search .............. 369/44.23, 369/112.01, 112.03, 112.11, 112.12, 112.23, 369/112.25, 112.06
  See application file for complete search history.

(56) References Cited

U.S. PATENT DOCUMENTS

| | | | |
|---|---|---|---|
| 5,627,806 A * | 5/1997 | Kobayashi | 369/44.23 |
| 6,181,666 B1 * | 1/2001 | Miyazaki et al. | 369/112.01 |
| 6,445,668 B2 * | 9/2002 | Sugiura et al. | 369/112.12 |
| 2002/0048233 A1 * | 4/2002 | Ogasawara et al. | 369/44.23 |
| 2002/0071360 A1 * | 6/2002 | Ogasawara | 369/44.37 |
| 2006/0013107 A1 * | 1/2006 | Nishiwaki et al. | 369/112.01 |
| 2006/0028932 A1 * | 2/2006 | Nakamura et al. | 369/44.23 |
| 2008/0219119 A1 * | 9/2008 | Izumi et al. | 369/53.17 |

FOREIGN PATENT DOCUMENTS

| | | |
|---|---|---|
| JP | 2006-252716 A | 9/2006 |
| JP | 2006-260669 A | 9/2006 |

* cited by examiner

*Primary Examiner* — Mohammad Ghayour
*Assistant Examiner* — Thomas Alunkal
(74) *Attorney, Agent, or Firm* — Ditthavong Mori & Steiner, P.C.

(57) ABSTRACT

An optical pickup device includes a photodetector which receives laser light reflected on a recording medium, and an optical system which guides laser light to the photodetector as convergent light. A light transmitting plate which imparts astigmatism to the laser light is disposed between the optical system and the photodetector with an inclination with respect to an optical axis of the laser light. The optical pickup device further includes an optical element which separates four light fluxes of the laser light from each other. The four light fluxes are obtained by dividing the laser light by two straight lines respectively in parallel to a first focal line direction of the laser light transmitted through the light transmitting plate, and a second focal line direction orthogonal to the first focal line direction.

6 Claims, 18 Drawing Sheets

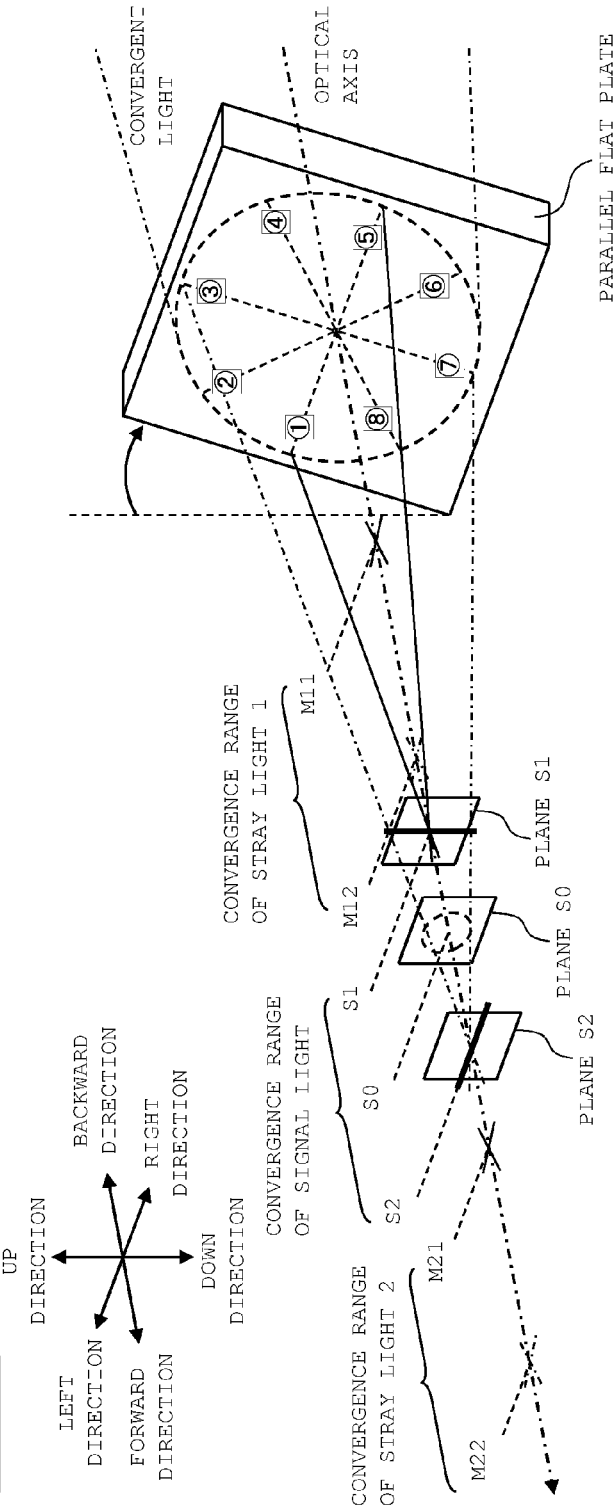
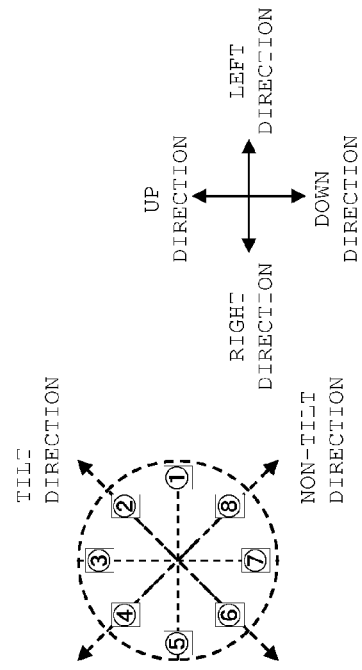
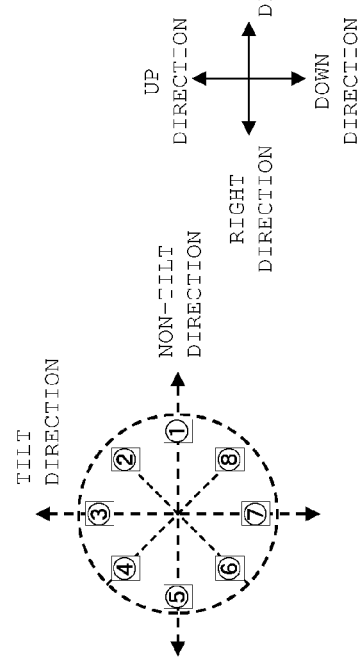

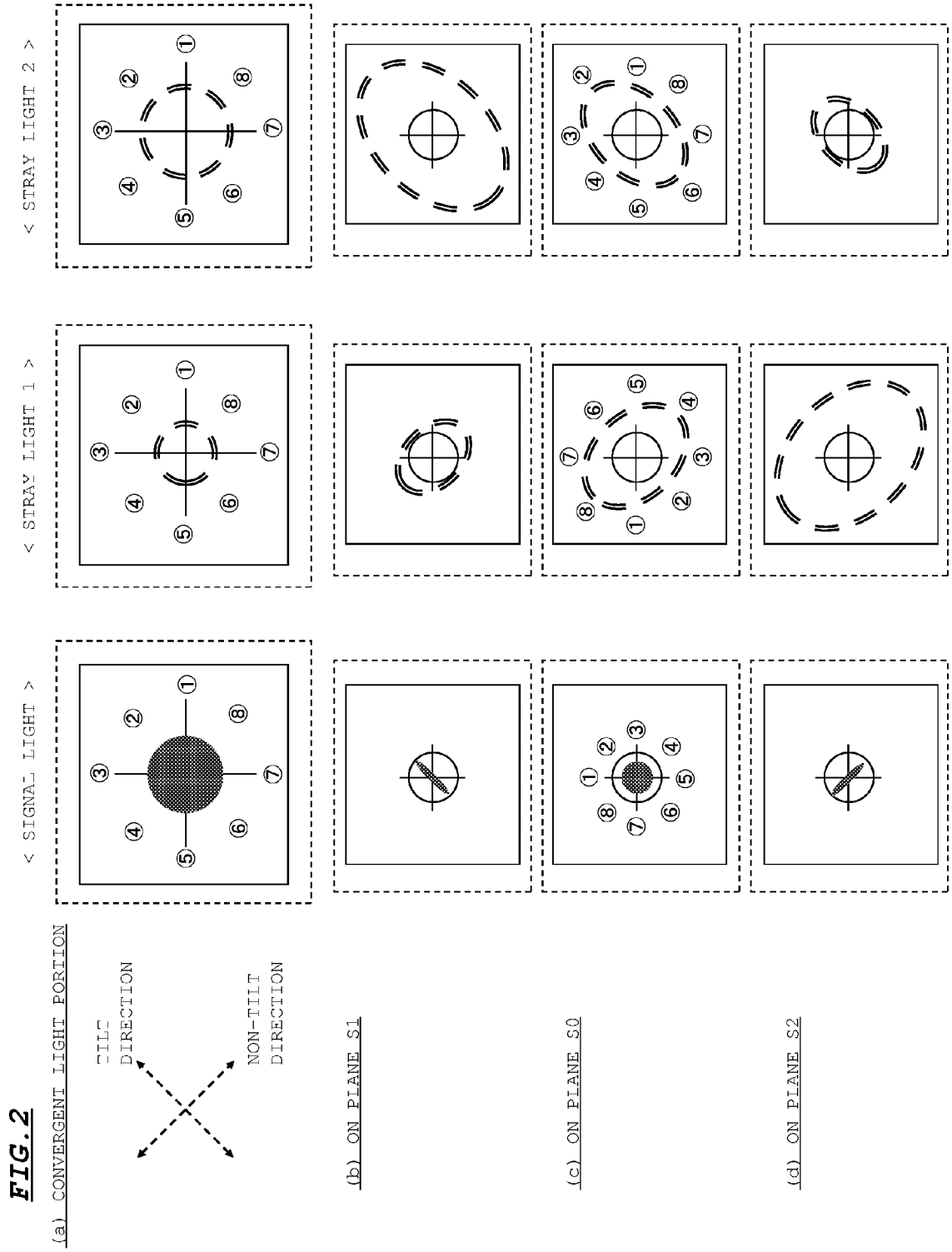

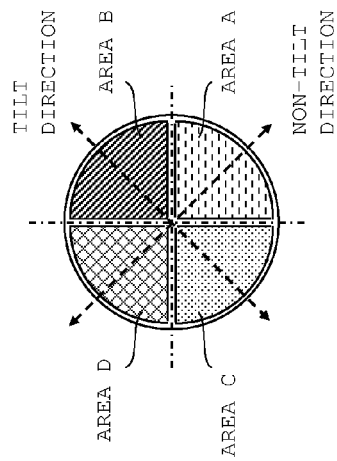
FIG.3A  LIGHT FLUX DIVIDING PATTERN
FIG.3B  SIGNAL LIGHT
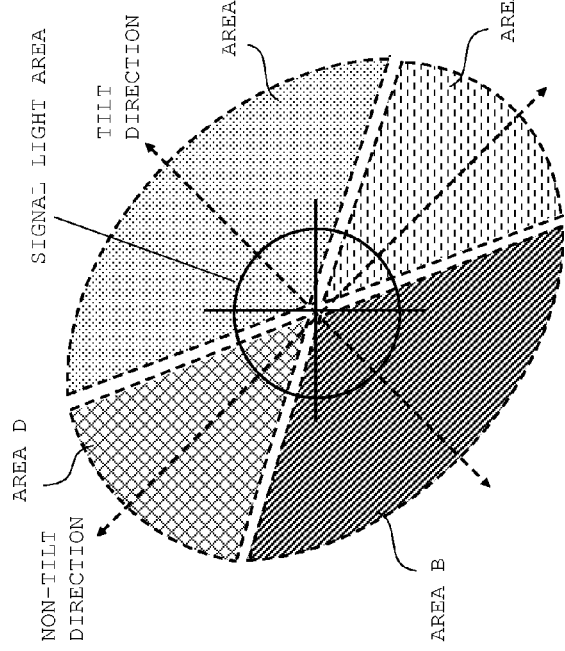
FIG.3C  STRAY LIGHT 1
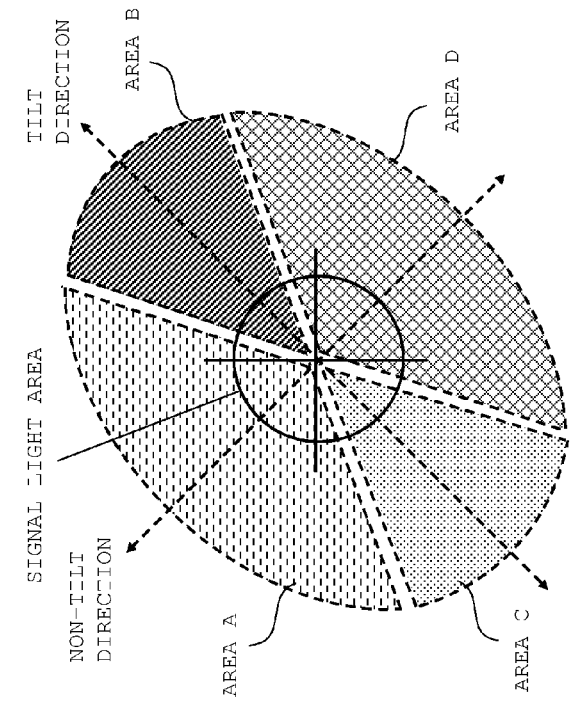
FIG.3D  STRAY LIGHT 2

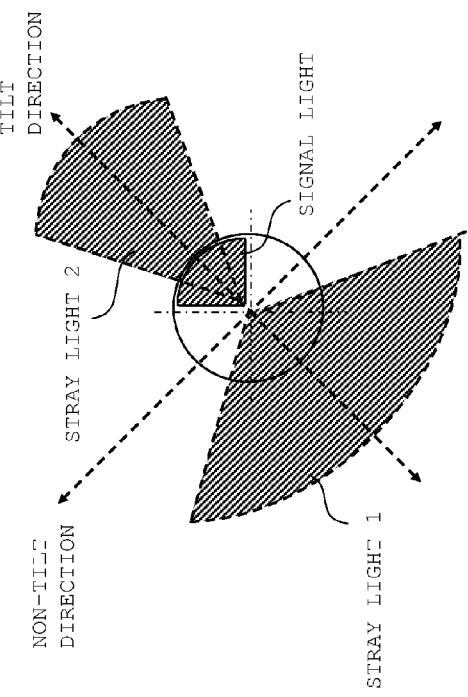
FIG. 4A    LIGHT FLUX STATE IN AREA A
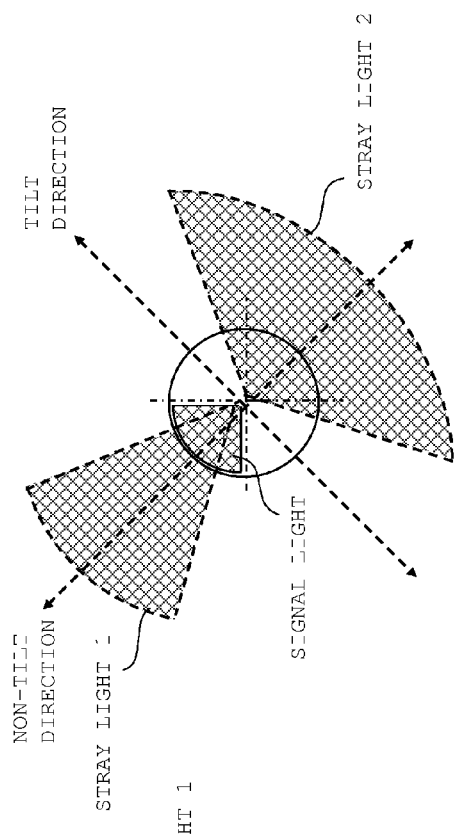
FIG. 4B    LIGHT FLUX STATE IN AREA B
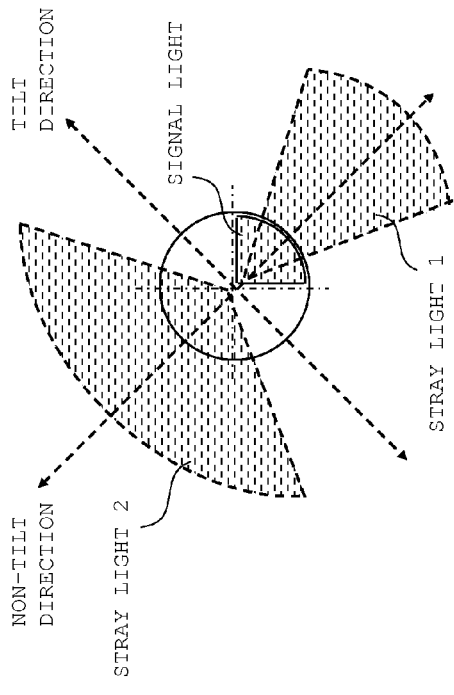
FIG. 4C    LIGHT FLUX STATE IN AREA C
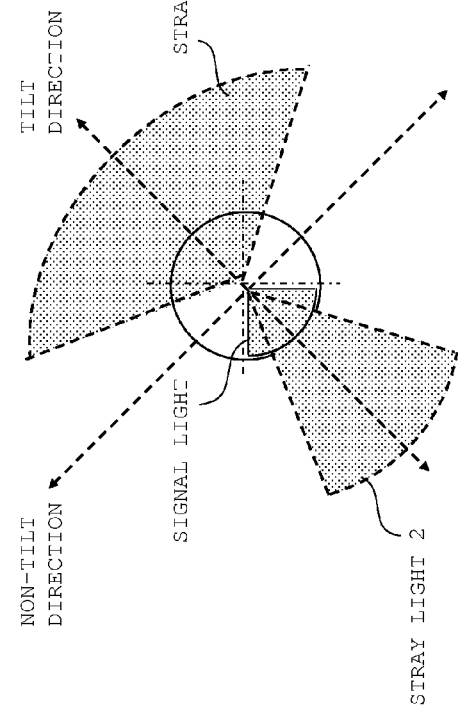
FIG. 4D    LIGHT FLUX STATE IN AREA D

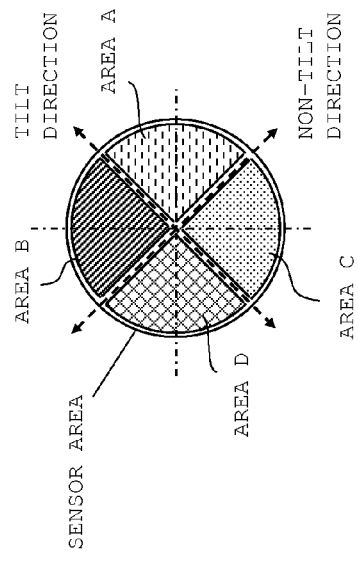
FIG. 5A  LIGHT FLUX DIVIDING PATTERN
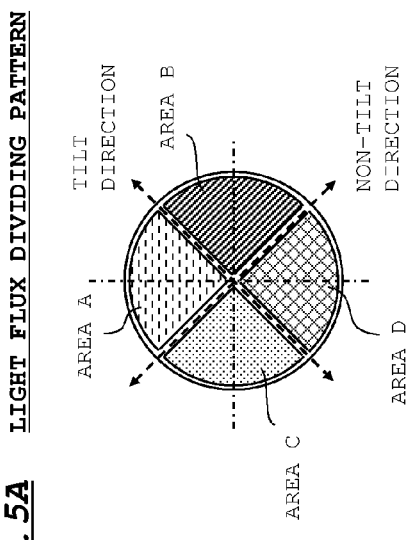
FIG. 5B  SIGNAL LIGHT
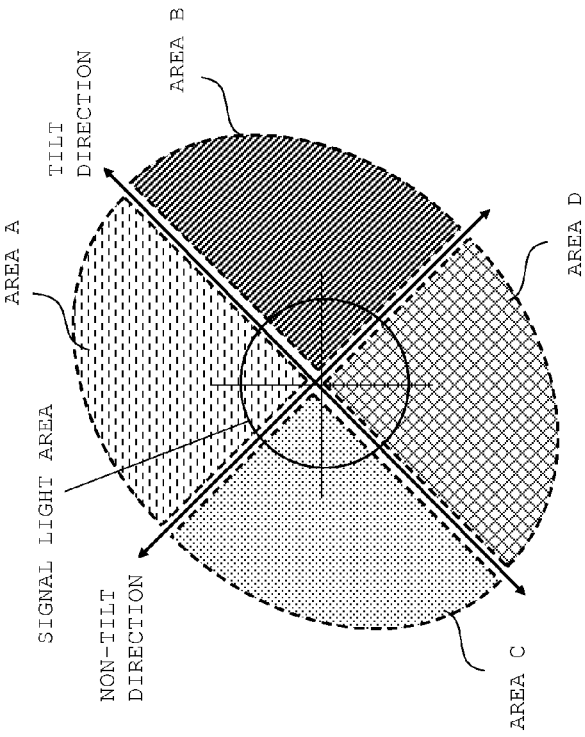
FIG. 5C  STRAY LIGHT 1
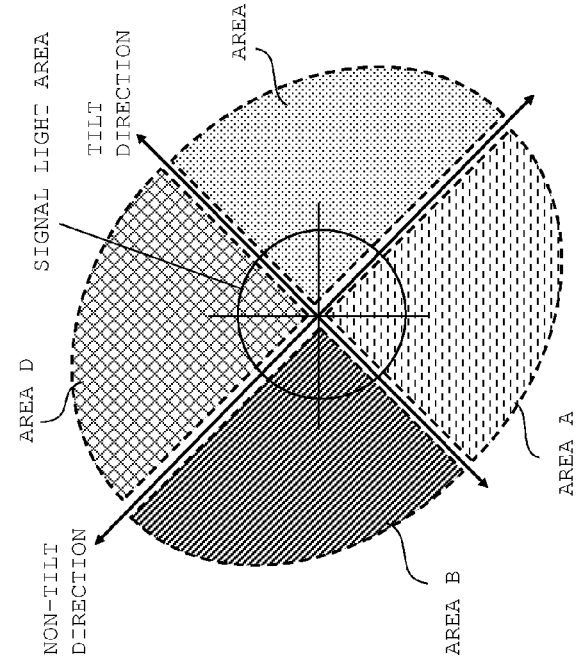
FIG. 5D  STRAY LIGHT 2

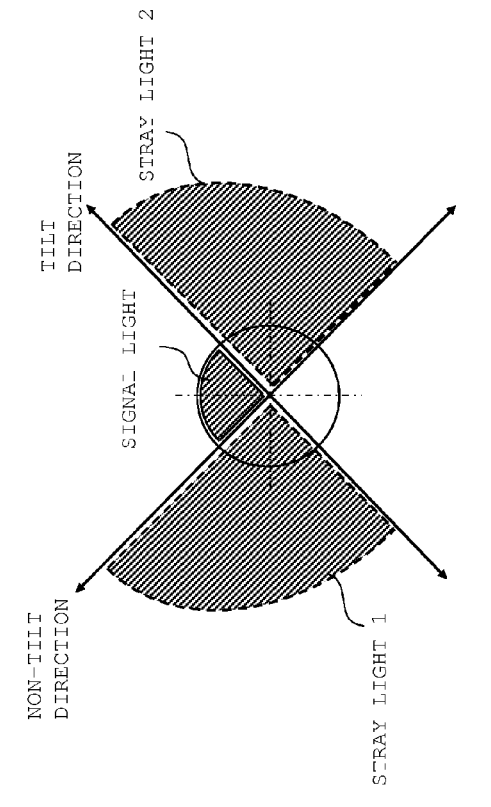
FIG. 6A  LIGHT FLUX STATE IN AREA A
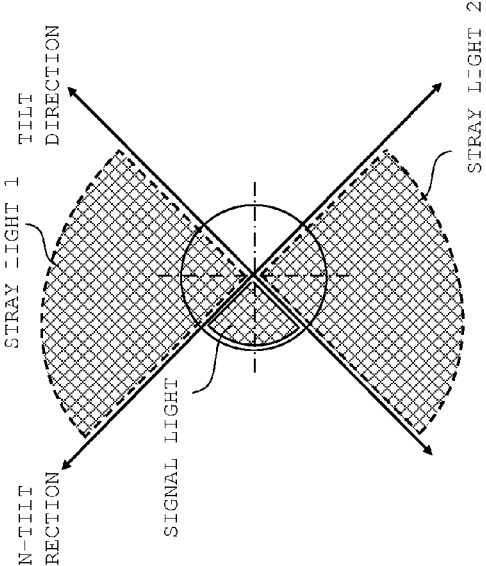
FIG. 6B  LIGHT FLUX STATE IN AREA B
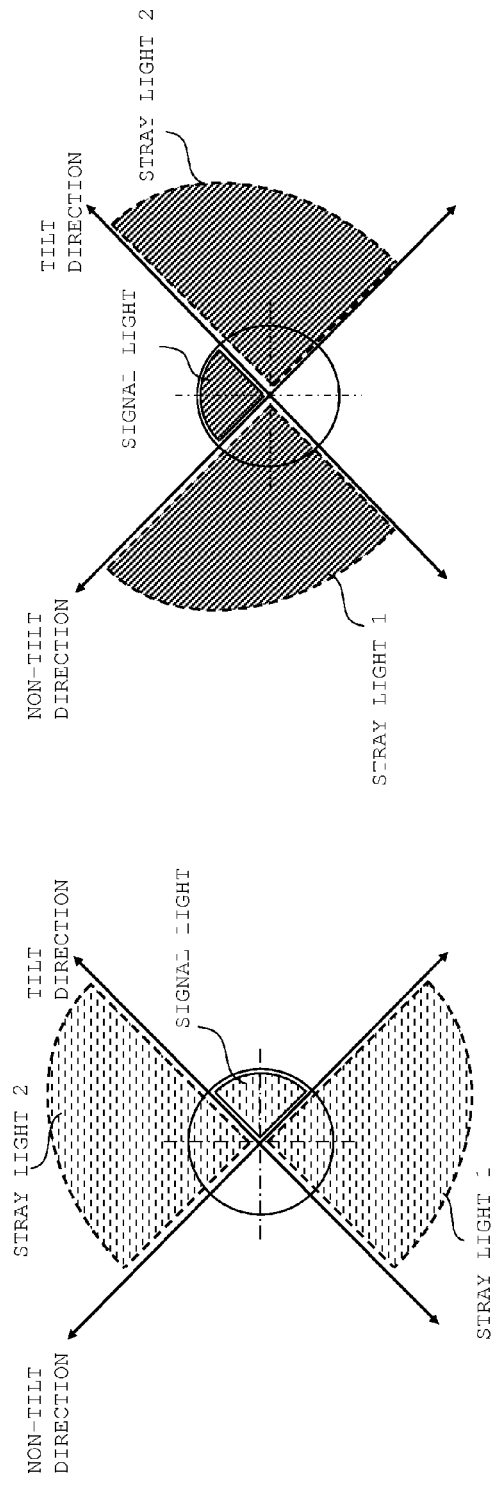
FIG. 6C  LIGHT FLUX STATE IN AREA C
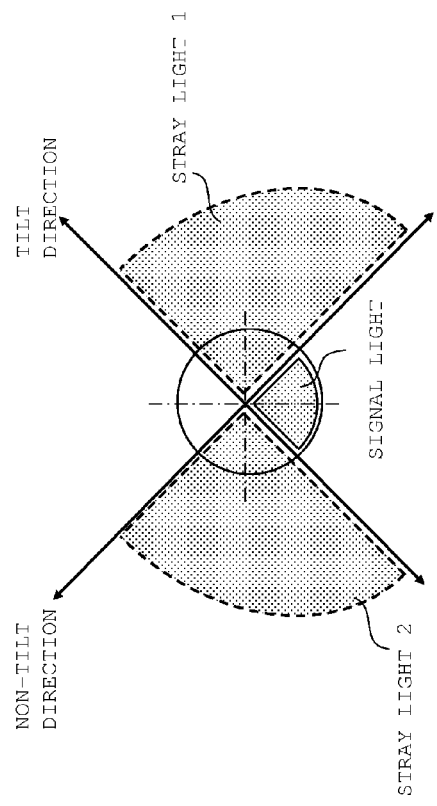
FIG. 6D  LIGHT FLUX STATE IN AREA D

IMPART ANGLE IN EACH OF AREAS

LIGHT FLUXES ON PLANE S0

FE = (A+B+E+F) − (C+D+G+H)
PP = (A+B+G+H) − (C+D+E+F)

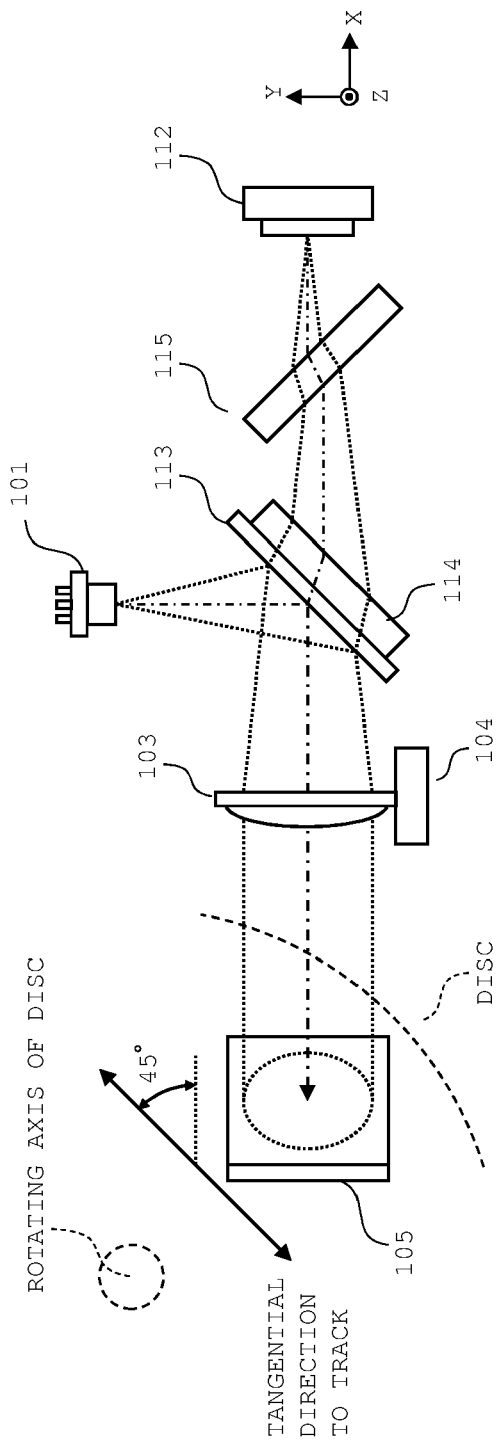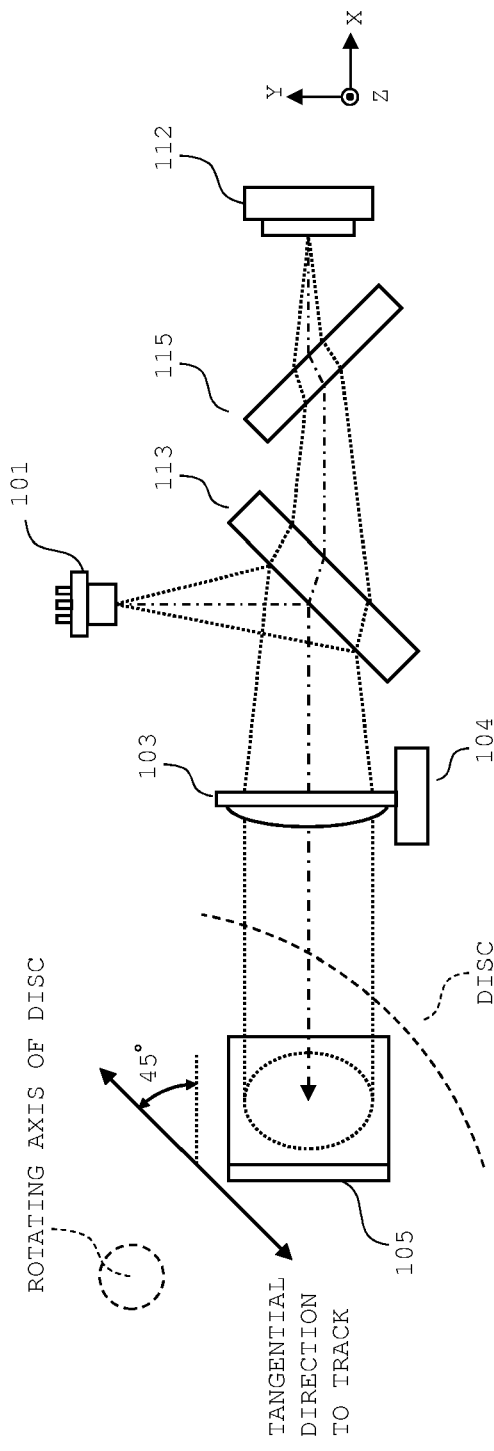

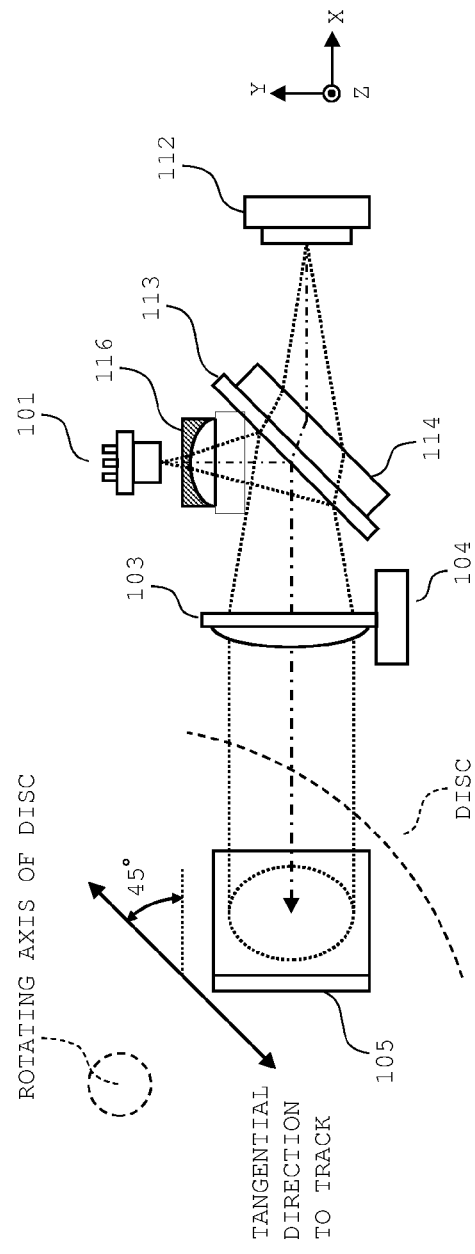
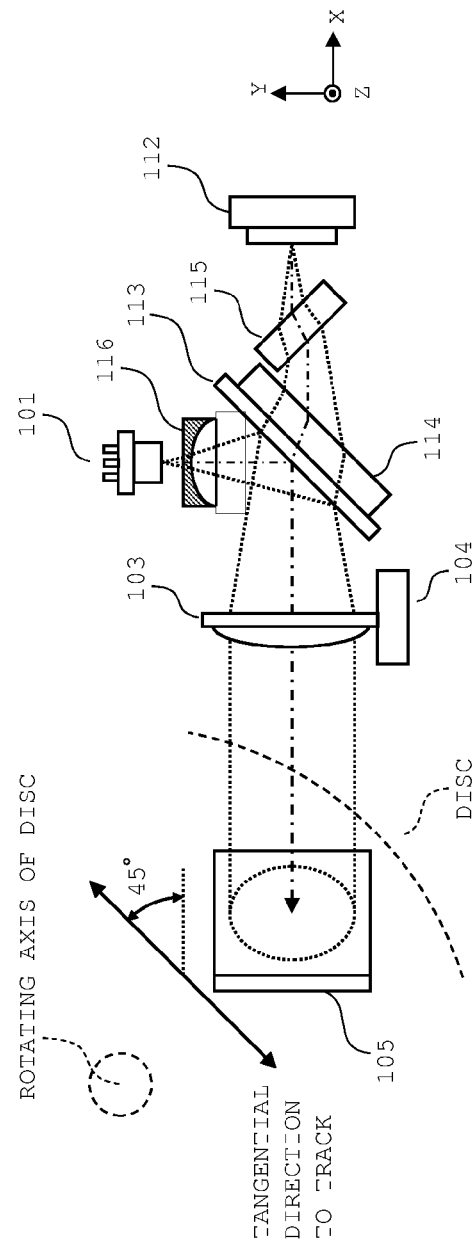

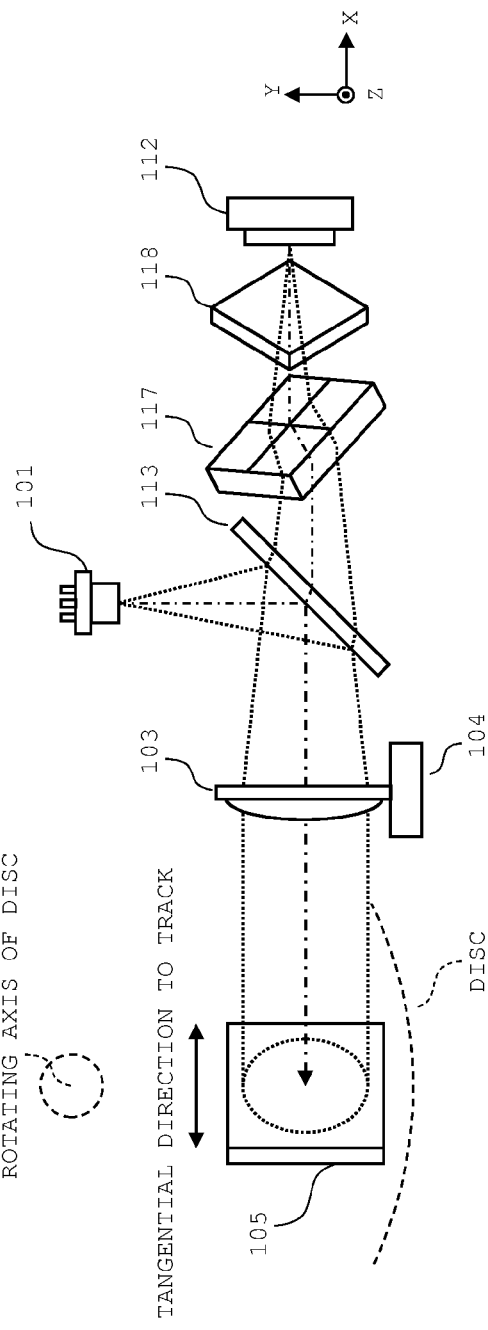

OPTICAL PICKUP DEVICE

This application claims priority under 35 U.S.C. Section 119 of Japanese Patent Application No. 2009-150480 filed Jun. 25, 2009, entitled "OPTICAL PICKUP DEVICE". The disclosure of the above applications is incorporated herein by reference.

BACKGROUND OF THE INVENTION

1. Field of the Invention

The present invention relates to an optical pickup device, and more particularly to an arrangement suitable for irradiating laser light to a recording medium having plural recording layers.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

As a method for removing stray light, there is proposed a method using a pinhole. In this method, a pinhole is formed at a position where signal light is converged. In this method, an unwanted stray light component entered into a photodetector can be reduced, because a part of stray light is blocked by the pinhole. There is proposed a method using a half wavelength plate and a polarizing optical element in combination, as another method for removing stray light. In this method, a polarization direction of stray light is changed by the half wavelength plate, and the stray light is blocked by the polarizing optical element. This enables to prevent an unwanted stray light component from being entered into a photodetector.

However, in the method for removing stray light using a pinhole, it is necessary to accurately position the pinhole at a position where laser light (signal light) reflected on a targeted recording layer is converged. In this method, therefore, it is difficult to adjust the position of the pinhole. If the size of the pinhole is increased to easily adjust the position of the pinhole, stray light is more likely to pass through the pinhole, which obstructs the effect of suppressing signal deterioration resulting from stray light.

In the method for removing stray light by combined use of a half wavelength plate and a polarizing optical element, each two half wavelength plates and polarizing optical elements are necessary. In addition, two lenses are necessary to remove stray light. Thus, the number of parts and the cost are increased. Further, it is cumbersome to adjust the arrangement positions of these members. Furthermore, it is necessary to secure a space for arranging these members side by side, which may increase the size of an optical system.

SUMMARY OF THE INVENTION

An optical pickup device according to a first aspect of the invention includes: a laser light source; an objective lens which converges laser light emitted from the laser light source on a recording medium; a photodetector which receives the laser light reflected on the recording medium; an optical system which guides the laser light to the photodetector as convergent light; a light transmitting plate which is disposed between the optical system and the photodetector with an inclination with respect to an optical axis of the laser light to impart astigmatism to the laser light; and an optical element which separates four light fluxes of the laser light from each other, the four light fluxes being obtained by dividing the laser light by two straight lines respectively in parallel to a first focal line direction and a second focal line direction, the first focal line direction being a direction of a first focal line of the laser light, the second focal line direction being a direction of a second focal line of the laser light and orthogonal to the first focal line direction, the first focal line and the second focal line being generated by the astigmatism imparted by the light transmitting plate.

An optical pickup device according to a second aspect of the invention includes a laser light source; an objective lens which converges laser light emitted from the laser light source on a recording medium; a photodetector which receives the laser light reflected on the recording medium; an optical system which guides the laser light to the photodetector as convergent light; a plurality of light transmitting plates which are disposed between the optical system and the photodetector with an inclination with respect to an optical axis of the laser light to impart astigmatism to the laser light; and a light flux separating section which separates four light fluxes of the laser light from each other, the four light fluxes being obtained by dividing the laser light by two straight lines respectively in parallel to a first focal line direction and a second focal line direction, the first focal line direction being a direction of a first focal line of the laser light, the second focal line direction being a direction of a second focal line of the laser light and orthogonal to the first focal line direction, the first focal line and the second focal line being generated by the astigmatism imparted by the light transmitting plates. The light transmitting plates are disposed at such positions as to suppress coma aberration of the laser light.

BRIEF DESCRIPTION OF THE DRAWINGS

These and other objects, and novel features of the present invention will become more apparent upon reading the following detailed description of the embodiment along with the accompanying drawings.

FIGS. 1A through 1C are diagrams for describing a technical principle (a convergence state of light rays) in an embodiment of the invention.

FIG. 2 are diagrams for describing the technical principle (a convergence state of light rays) in the embodiment.

FIGS. 3A through 3D are diagrams for describing the technical principle (distribution states of signal light and stray light) in the embodiment.

FIGS. 4A through 4D are diagrams for describing the technical principle (distribution states of signal light and stray light) in the embodiment.

FIGS. 5A through 5D are diagrams for describing the technical principle (distribution states of signal light and stray light) in the embodiment.

FIGS. 6A through 6D are diagrams for describing the technical principle (distribution states of signal light and stray light) in the embodiment.

FIGS. 13A and 13B are diagrams showing a modification of the optical system of the optical pickup device as Example 2.

FIGS. 14A and 14B are diagrams showing an optical system of an optical pickup device as Example 3.

FIGS. 17A and 17B are diagrams showing a modification of the optical system of the optical pickup device as Example 4.

Figure 7A:
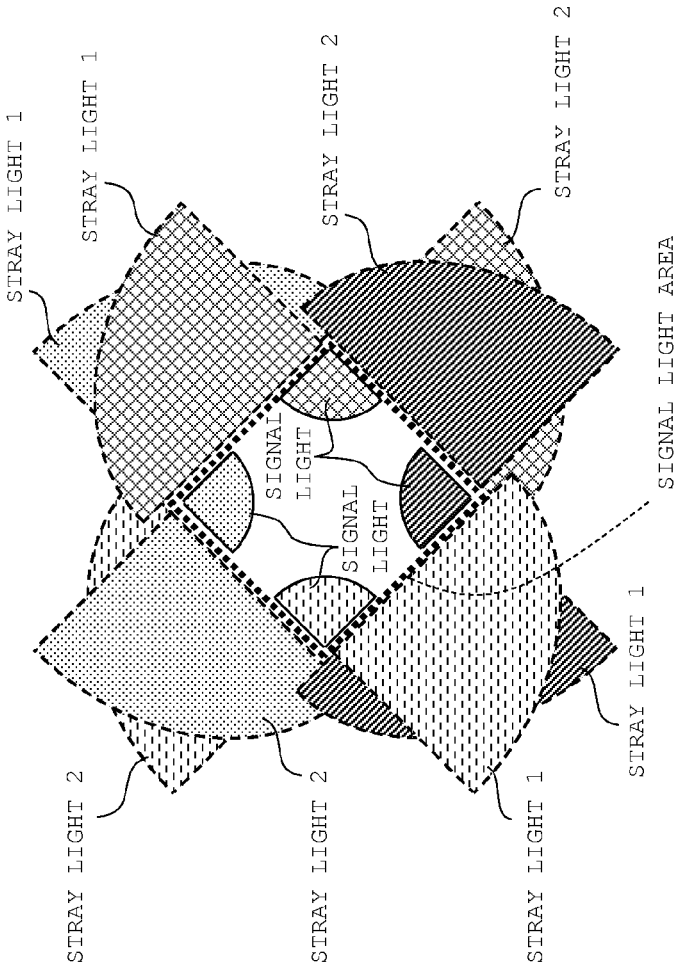
FIGS. 7A and 7B are diagrams for describing the technical principle (a method for separating light fluxes) in the embodiment.

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle to which the embodiment of the invention is applied is described referring to FIGS. 1A through 8D.

FIG. 1A is a diagram showing a state that laser light (signal light) reflected on a targeted recording layer, laser light (stray light 1) reflected on a layer at a rearward position with respect to the targeted recording layer, and laser light (stray light 2) reflected on a layer at a forward position with respect to the targeted recording layer are converged on a parallel flat plate as convergent light. FIG. 1A shows a state that signal light is focused on the targeted recording layer.

The parallel flat plate is a flat planar transmission element which does not have a light collecting function. As shown in FIG. 1A, the parallel flat plate is disposed with an inclination in a forward direction or a backward direction with respect to a vertical direction perpendicular to an optical axis of laser light (reflected light) reflected on a disc. Further, reflected light is entered into the parallel flat plate as convergent light. Accordingly, an optical path difference is generated in reflected light between the vertical direction (up and down directions in FIG. 1A) and a transverse direction (left and right directions in FIG. 1A), and a displacement occurs at a convergence position of a light flux of reflected light.

FIG. 1B is a diagram showing a light flux of reflected light (a convergent light portion) before incidence into the parallel flat plate in a plane perpendicular to the optical axis of reflected light, when viewed from the propagating direction of reflected light. As shown in FIG. 1B, eight positions (positions 1 through 8 which are indicated by circled numbers in FIG. 1B) are defined in counterclockwise direction along an outer perimeter of a beam of the convergent light portion. FIG. 1B also shows a direction (hereinafter, called as a "tilt direction") along which the parallel flat plate is inclined, and a direction (hereinafter, called as a "non-tilt direction) along which the parallel flat plate is not inclined.

The position 3 and the position 7 are positioned on a parting line to be used in dividing a beam section of the convergent light portion into two by a straight line in parallel to the tilt direction, and the position 1 and the position 5 are positioned on a parting line to be used in dividing the beam section of the convergent light portion into two by a straight line in parallel to the non-tilt direction. The positions 2, 4, 6, and 8 are respectively positioned at middle positions of outer perimetric arc portions defined by the positions 1 and 3, the positions 3 and 5, the positions 5 and 7, and the positions 7 and 1.

Referring back to FIG. 1A, signal light forms focal lines at different positions from each other by convergences in the tilt direction and the non-tilt direction. The focal line position (S2) of signal light by convergence in the tilt direction is farther away from the parallel flat plate than the focal line position (S1) of signal light by convergence in the non-tilt direction. The convergence position (S0) of signal light to be described later is a middle position (in the convergence range) between the focal line position (S1) and the focal line position (S2).

Similarly to signal light, the focal line position (M12) of stray light 1 by convergence in the tilt direction is farther away from the parallel flat plate than the focal line position (M11) of stray light 1 by convergence in the non-tilt direction. The optical system is designed in such a manner that the focal line position (M12) of stray light 1 by convergence in the tilt direction is set closer to the parallel flat plate than the convergence position (S0) of signal light.

Similarly to stray light 1, the focal line position (M22) of stray light 2 by convergence in the tilt direction is farther away from the parallel flat plate than the focal line position (M21) of stray light 2 by convergence in the non-tilt direction. The optical system is designed in such a manner that the focal line position (M21) of stray light 2 by convergence in the non-tilt direction is set farther away from the parallel flat plate than the convergence position (S0) of signal light.

Thus, as shown in FIG. 1A, a focal line of signal light is formed in the vertical direction on a plane (a plane 51) perpendicular to the optical axis at the focal line position (51), and a focal line of signal light is formed in the transverse direction on a plane (a plane S2) perpendicular to the optical axis at the focal line position (S2) by the parallel flat plate. Accordingly, the spot of signal light is most approximated to a true circle on a plane (a plane S0) perpendicular to the optical axis at the convergence position (S0). In performing focus adjustment based on an astigmatism method, a light receiving surface of a photodetector is placed on the plane S0.

In FIG. 1A, the parallel flat plate is disposed with an inclination in the forward direction or the backward direction with respect to the vertical direction perpendicular to the optical axis of reflected light. Alternatively, it is possible to change the tilt direction and the non-tilt direction with respect to reflected light by rotating the parallel flat plate about the optical axis from the state shown in FIG. 1A. Specifically, in FIG. 1A, rotating the parallel flat plate by 90° about the optical axis aligns the transverse direction with the tilt direction, and aligns the vertical direction with the non-tilt direction, with respect to reflected light. Further, rotating the parallel flat plate by 45° clockwise about the optical axis, when viewed from the backward direction in FIG. 1A, changes the tilt direction and the non-tilt direction by 45° from the state shown in FIG. 1B to the state shown in FIG. 1C. Thus, rotating the parallel flat plate about the optical axis results in rotating the focal lines of signal light, and stray light 1 and 2 in accordance with the rotation of the parallel flat plate.

FIG. 2 is diagrams showing the beam shapes of signal light, and stray light 1 and 2 on the convergent light portion, and the planes S1, S0, and S2. In the similar manner as shown in FIG. 1C, FIG. 2 shows cases, wherein the tilt direction and the non-tilt direction by the parallel flat plate are inclined by 45° with respect to the vertical direction and the transverse direction, respectively.

Referring to signal light in the left column in FIG. 2, light rays passing the positions 4 and 8 before incidence into the parallel flat plate are entered into the plane S0 after convergence into a focal line in the non-tilt direction on the plane S1. Accordingly, the light rays passing the positions 4 and 8 pass the positions 4 and 8 shown in the diagram (c) in the left column in FIG. 2, on the plane S0. Likewise, since light rays passing the positions 1, 3, 5, and 7 before incidence into the parallel flat plate are entered into the plane S0 after convergence into a focal line in the non-tilt direction on the plane S1, the light rays passing the positions 1, 3, 5, and 7 pass the positions 1, 3, 5, and 7 shown in the diagram (c) in the left column in FIG. 2, on the plane S0. On the other hand, light rays passing the positions 2 and 6 before incidence into the parallel flat plate are entered into the plane S0 without convergence into a focal line in the non-tilt direction on the plane S1. Accordingly, the light rays passing the positions 2 and 6 pass the positions 2 and 6 shown in the diagram (c) in the left column in FIG. 2, on the plane S0.

Referring to stray light 1 in the middle column in FIG. 2, light rays passing the portions 1 through 8 before incidence into the parallel flat plate are entered into the plane S0 after forming a focal line at both of the focal line position (M11) and the focal line position (M12). Accordingly, the light rays of stray light 1 passing the positions 1 through 8 respectively pass the positions 1 through 8 shown in the diagram (c) in the middle column in FIG. 2, on the plane S0.

Referring to stray light 2 in the right column in FIG. 2, light rays passing the positions 1 through 8 before incidence into the parallel flat plate are entered into the plane S0 without convergence into any of a focal line in the tilt direction and a focal line in the non-tilt direction. Accordingly, the light rays of stray light 2 passing the positions 1 through 8 respectively pass the positions 1 through 8 shown in the diagram (c) in the right column in FIG. 2, on the plane S0.

Next, there is described a relation between an area dividing pattern of signal light, and stray light 1 and 2 before incidence into the parallel flat plate, and irradiation areas of signal light, and stray light 1 and 2 on the plane S0, considering the above phenomenon.

As shown in FIG. 3A, let us assume that signal light, and stray light 1 and 2 before incidence into the parallel flat plate are divided into four light flux areas A through D by two straight lines respectively inclined by 45° with respect to the tilt direction and the non-tilt direction. The area dividing pattern corresponds to an area dividing based on a conventional astigmatism method.

Because of the above phenomenon, signal light in the light flux areas A through D has a distribution on the plane S0, as shown in FIG. 3B; and stray light 1 and stray light 2 in the light flux areas A through D have distributions on the plane S0, as shown in FIGS. 3C and 3D, respectively.

In the above example, if signal light, and stray light 1 and 2 on the plane S0 are extracted with respect to each of the light flux areas, the distributions of signal light, and stray light 1 and 2 are as shown in FIGS. 4A through 4D. In this case, signal light in each of the light flux areas is superimposed on either one of stray light 1 and stray light 2 in the corresponding light flux area. Accordingly, if signal light in each of the light flux areas is received on a corresponding sensing portion of a photodetector, at least stray light 1 or stray light 2 in the corresponding light flux area is simultaneously entered into the corresponding sensing portion, resulting in deterioration of a detection signal.

On the other hand, let us assume that, as shown in FIG. 5A, signal light, and stray light 1 and 2 before incidence into the parallel flat plate are divided into four light flux areas A through D by two straight lines in parallel to the tilt direction and the non-tilt direction. In this case, because of the above phenomenon, signal light in the light flux areas A through D has a distribution on the plane S0, as shown in FIG. 5B; and stray light 1 and stray light 2 in the light flux areas A through D have distributions on the plane S0, as shown in FIGS. 5C and 5D, respectively.

In the above example, if signal light, and stray light 1 and 2 on the plane S0 are extracted with respect to each of the light flux areas, the distributions of signal light, and stray light 1 and 2 are as shown in FIGS. 6A through 6D. In this case, signal light in each of the light flux areas is not superimposed with any of stray light 1 and stray light 2 in the corresponding light flux area. Accordingly, separating the light fluxes (signal light, and stray light 1 and 2) in each of the light flux areas in different directions from each other, and then allowing only signal light to be received by a corresponding sensing portion allows incidence of only signal light into the corresponding sensing portion, while preventing incidence of stray light. This enables to avoid deterioration of a detection signal resulting from stray light.

As described above, dividing signal light, and stray light 1 and 2 into four light flux areas A through D by two straight lines in parallel to the tilt direction and the non-tilt direction, and dispersing the light passing the light flux areas A through D to separate the light on the plane S0 from each other enables to extract only signal light. The embodiment is made based on the above principle.

Figure 7B:
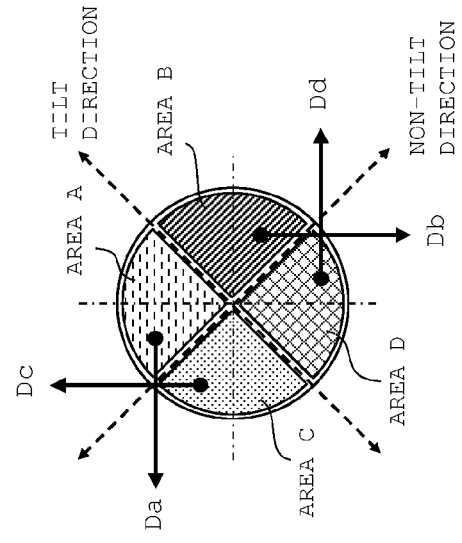

FIGS. 7A and 7B are diagrams showing distribution states of signal light, and stray light 1 and 2 on the plane S0, in the case where the propagating directions of light fluxes (signal light, and stray light 1 and 2) passing the four light flux areas A through D shown in FIG. 5A are respectively changed by a certain angle in different directions from each other. As shown in FIG. 7A, the propagating directions of light fluxes (signal light, and stray light 1 and 2) passing the light flux areas A through D are respectively changed into directions Da, Db, Dc, and Dd with respect to the propagating directions of the respective light fluxes before incidence by a certain angle amount α (not shown). The directions Da, Db, Dc, and Dd are respectively inclined by an angle of 45° with respect to the tilt direction and the non-tilt direction.

In the above arrangement, signal light, and stray light 1 and 2 in each of the light flux areas can be distributed on the plane S0 as shown in FIG. 7B by adjusting the angle amount α with respect to the directions Da, Db, Dc, and Dd. As a result, as shown in FIG. 7B, a signal light area where only signal light exists can be defined on the plane S0. Arranging the sensing portions of the photodetector at a position corresponding to the signal light area allows only signal light in each of the areas to be received by the corresponding sensing portion of the photodetector.

Figure 8A:
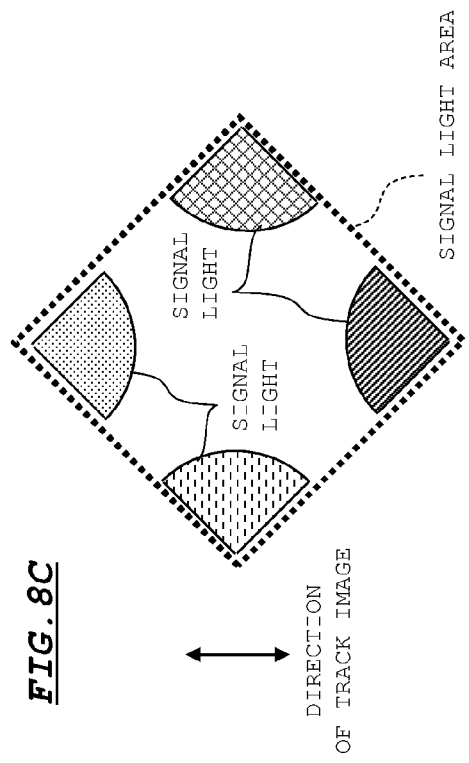
FIGS. 8A through 8D are diagrams showing a method for arranging sensing portions in the embodiment.
Figure 8C:
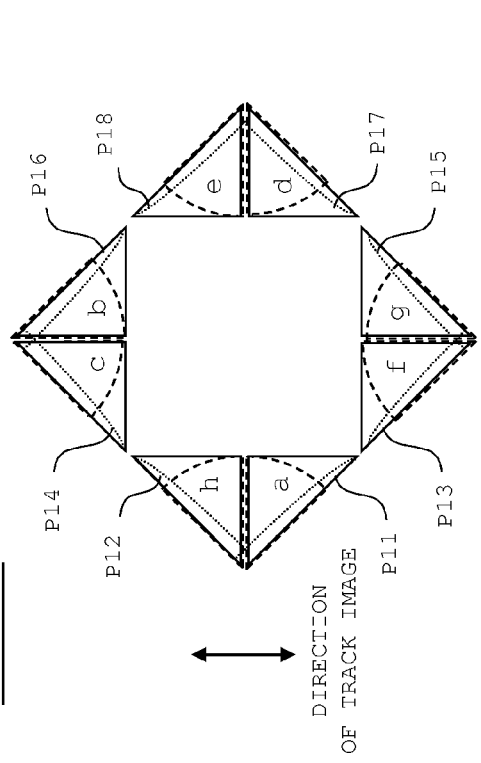
Figure 8B:
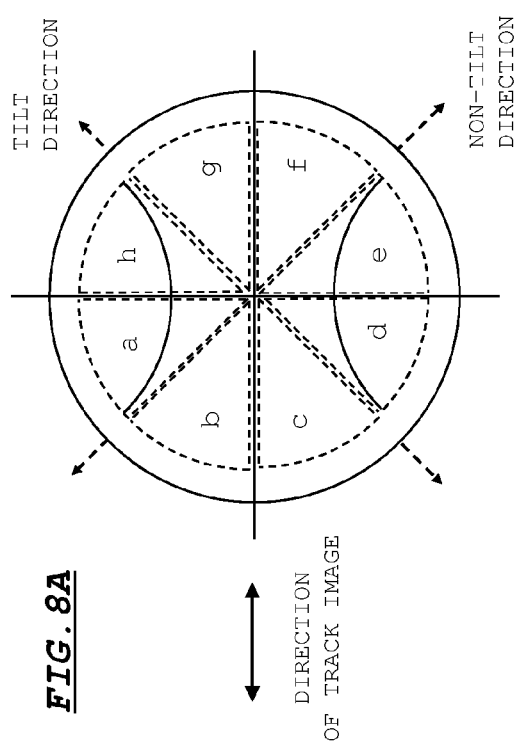
Figure 8D:
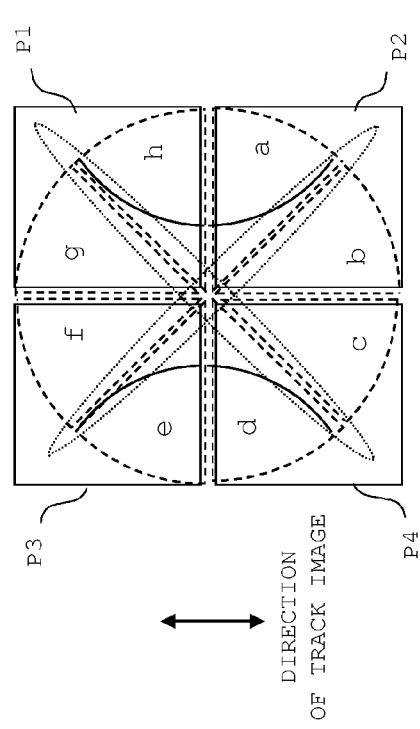

FIGS. 8A through 8D are diagrams for describing a method for arranging sensing portions of a photodetector. FIG. 8A is a diagram showing a light flux area of reflected light (signal light) from a disc. FIG. 8B is a diagram showing a distribution state of signal light on a photodetector (a four-division sensor), in the case where the photodetector based on a conventional astigmatism method is disposed on the plane S0 in the arrangement shown in FIG. 1A. FIGS. 8C and 8D are diagrams showing a distribution state of signal light, and an arrangement of sensing portions, on the plane S0, based on the above principle.

Referring to FIGS. 8A through 8D, the direction of an image (a track image) formed by diffraction of signal light by a track groove is inclined by 45° with respect to the tilt direction and the non-tilt direction. Referring to FIG. 8A, assuming that the direction of a track image is aligned with a transverse direction in FIG. 8A, the direction of a track image of signal light is aligned with a vertical direction in FIGS. 8B through 8D. To simplify the description, a light flux is divided into eight light flux areas "a" through "h" in FIGS. 8A and 8B. Further, the track image is shown by the solid line, and the beam shape in an off-focus state is shown by the dotted line. It is known that a superimposed state of a 0-th order diffraction image and a first order diffraction image of signal light by a track groove is obtained by the ratio: wavelength/(track pitch×NA of an objective lens). As shown in FIGS. 8A, 8B, and 8D, a condition for forming a first order diffraction image in the four light flux areas "a", "d", "e", and "h" is expressed by: wavelength/(track pitch×NA of an objective lens)>√2.

In the conventional astigmatism method, sensing portions P1 through P4 of a photodetector (a four-division sensor) are set as shown in FIG. 8B. In this arrangement, a focus error signal FE and a push-pull signal PP are obtained by implementing the following equations (1) and (2):

$$FE=(A+B+E+F)-(C+D+G+H) \quad (1)$$

$$PP=(A+B+G+H)-(C+D+E+F) \quad (2)$$

where A through H are detection signal components based on light intensities of light flux areas "a" through "h".

On the other hand, as described above, signal light is distributed in the signal light area, as shown in FIG. 8C, in the distribution state shown in FIG. 7B. In this case, signal light passing the light flux areas "a" through "h" shown in FIG. 8A is as shown in FIG. 8D. Specifically, signal light passing the light flux areas "a" through "h" in FIG. 8A is guided to light flux areas "a" through "h" shown in FIG. 8D, on the plane S0 where the sensing portions of the photodetector are disposed.

Accordingly, setting sensing portions P11 through P18 as shown in an overlapped state in FIG. 8D at the positions corresponding to the light flux areas "a" through "h" shown in FIG. 8D enables to generate a focus error signal and a push-pull signal by performing the same computation as the computation described referring to FIG. 8B. Specifically, similarly to the case of FIG. 8B, a focus error signal FE and a push-pull signal PP can be obtained by implementing the equations (1) and (2), wherein A through H are detection signals from the sensing portions for receiving light fluxes in the light flux areas "a" through "h".

As described above, according to the principle of the embodiment, dividing signal light, and stray light 1 and 2 in a convergent light portion into four light flux areas A through D by two straight lines in parallel to the tilt direction and the non-tilt direction; dispersing the light passing the light flux areas A through D; and allowing the signal light in each of the light flux areas A through D after the dispersion to be individually received by corresponding two sensing portions enables to generate a focus error signal and a push-pull signal (a tracking error signal) by performing the same computation as applied in the conventional astigmatism method.

EXAMPLE

In this section, Example 1 based on the above principle is described.

Figure 9A:
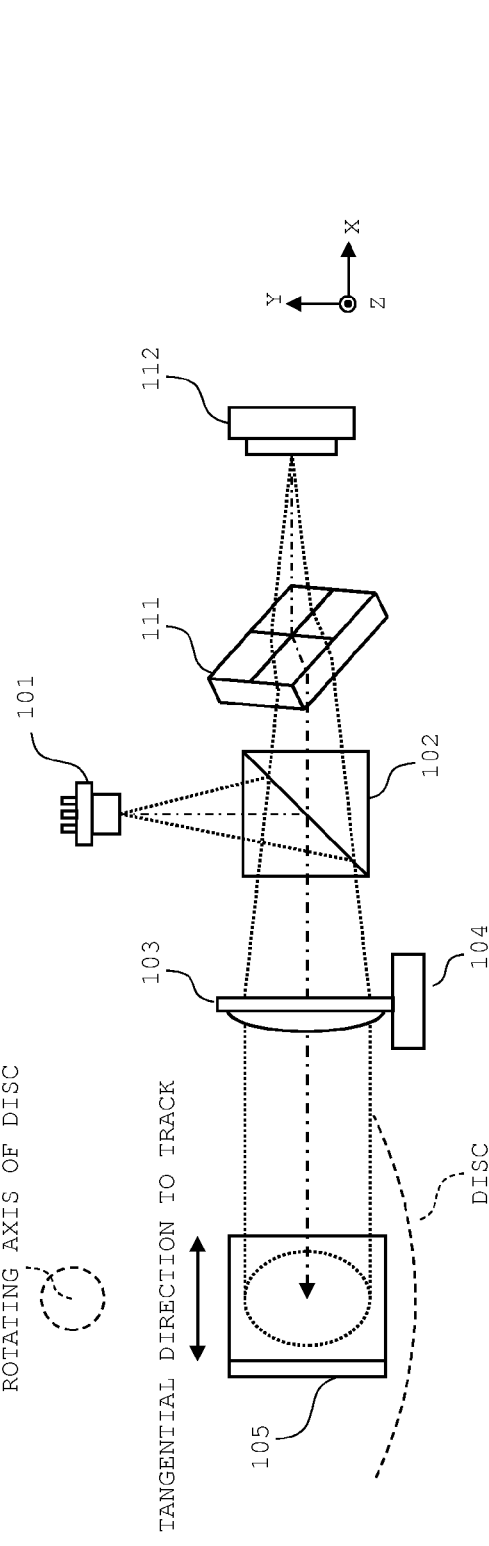
FIGS. 9A through 9C are diagrams showing an optical system of an optical pickup device as Example 1.
Figure 9C:
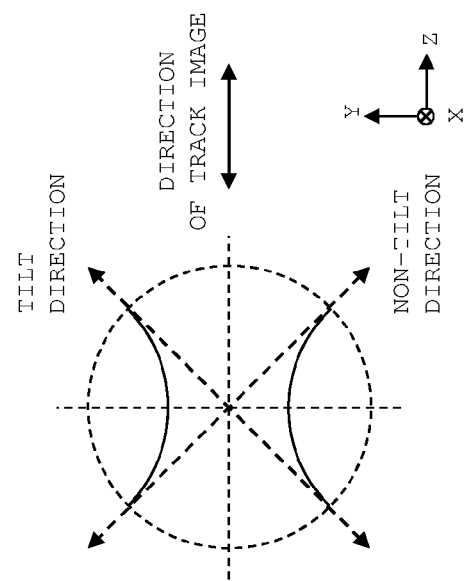
Figure 9B:
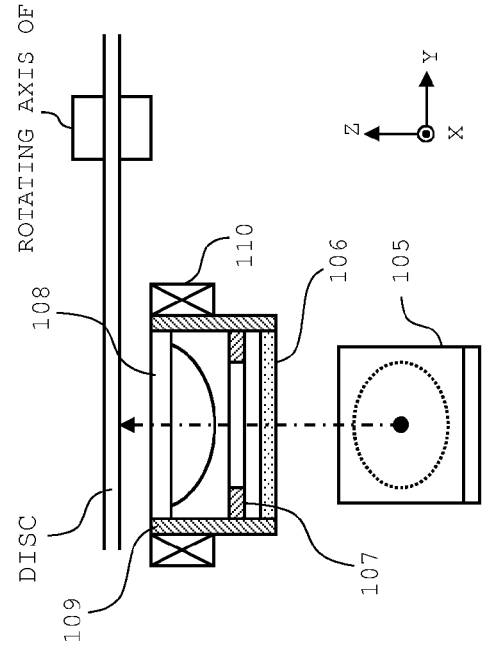

FIGS. 9A through 9C are diagrams showing an optical system of an optical pickup device as an example of the invention. FIG. 9A shows elements of the optical system except for the elements on the side of a disc with respect to a rise-up mirror 105, and FIG. 9B shows the elements of the optical system on the disc side with respect to the rise-up mirror 105. The disc in FIGS. 9A and 9B is formed by laminating plural recording layers.

As shown in FIGS. 9A and 9B, the optical system of the optical pickup device includes a semiconductor laser 101, a polarized beam splitter 102, a collimator lens 103, a lens actuator 104, the rise-up mirror 105, a quarter wavelength plate 106, an aperture 107, an objective lens 108, a holder 109, an objective lens actuator 110, a flat plate element 111, and a photodetector 112.

The semiconductor laser 101 emits laser light of a predetermined wavelength. The divergence angle of laser light to be emitted from the semiconductor laser 101 is such that the horizontal divergence angle and the vertical divergence angle are different from each other.

The polarized beam splitter 102 substantially totally reflects laser light (S-polarized light) to be entered from the semiconductor laser 101, and substantially totally transmits laser light (P-polarized light) to be entered from the side of the collimator lens 103.

The collimator lens 103 converts laser light to be entered from the side of the polarized beam splitter 102 into parallel light. In this example, the optical system is designed in such a manner that the angle (hereinafter, called as a "swing angle") defined by the optical axis of the collimator lens 103, and the tangential direction to a track at a laser light irradiation position on the disc is set to 0°.

The lens actuator 104 displaces the collimator lens 103 in an optical axis direction so that an aberration in laser light is corrected. The rise-up mirror 105 reflects the laser light (in the minus X-axis direction) entered from the side of the collimator lens 103 in a direction (in the plus Z-axis direction) toward the objective lens 108.

The quarter wavelength plate 106 converts laser light directed to the disc into circularly polarized light, and converts reflected light from the disc into linearly polarized light orthogonal to a polarization direction toward the disc. Thereby, the laser light reflected on the disc is transmitted through the polarized beam splitter 102.

The aperture 107 adjusts the beam shape of laser light into a circular shape to properly set the effective diameter of laser light with respect to the objective lens 108. The objective lens 108 is so designed as to properly converge laser light onto a targeted recording layer in the disc. The holder 109 integrally holds the quarter wavelength plate 106, the aperture 107, and the objective lens 108. The objective lens actuator 110 is constituted of a conventional well-known electromagnetic drive circuit. A coil portion such as a focus coil of the electromagnetic drive circuit is mounted on the holder 109.

The flat plate element 111 is a flat planar transmission element. As shown in FIG. 9C, the flat plate element 111 is disposed at such a position that the tilt direction and the non-tilt direction are inclined by 45° with respect to a direction of a track image of reflected light. As will be described later, four tilted surfaces having different angles from each other are formed on a light exit surface of the flat plate element 111.

Light fluxes in light flux areas (corresponding to the light flux areas A through D shown in FIG. 7A) obtained by dividing the laser light into four by two straight lines in parallel to the tilt direction and the non-tilt direction are respectively entered into the four tilted surfaces. The propagating directions of the four light fluxes are changed into the directions Da through Dd shown in FIG. 7A by refraction on the respective corresponding tilted surfaces. Accordingly, the light flux areas of reflected light (signal light, and stray light 1 and 2) to be entered into the flat plate element 111 are distributed on the plane S0, as shown in FIG. 7B. Thus, the flat plate element 111 has both of the astigmatism function described referring to FIGS. 1A through 1C, and the spectral function described referring to FIG. 7A.

The photodetector 112 has the sensing portions P11 through P18 as shown in FIG. 8D. The photodetector 112 is disposed in such a manner that the sensing portions are positioned at the position of the plane S0 shown in FIG. 1A. The sensing portions P11 through P18 of the photodetector 112 respectively receive light fluxes passing the light flux areas "a" through "h" shown in FIG. 8D.

Detection signals outputted from the eight sensing portions of the photodetector 112 are subjected to computation processing in accordance with the equations (1) and (2) to thereby generate a focus error signal and a push-pull signal. Then, the objective lens actuator 110 is controlled based on the focus error signal and the push-pull signal. Further, a reproduction RF signal is generated, based on the detection signals outputted from the eight sensing portions of the photodetector 112 to thereby generate reproduction data. The lens actuator 104 is controlled based on the reproduction data.

Figure 10A:
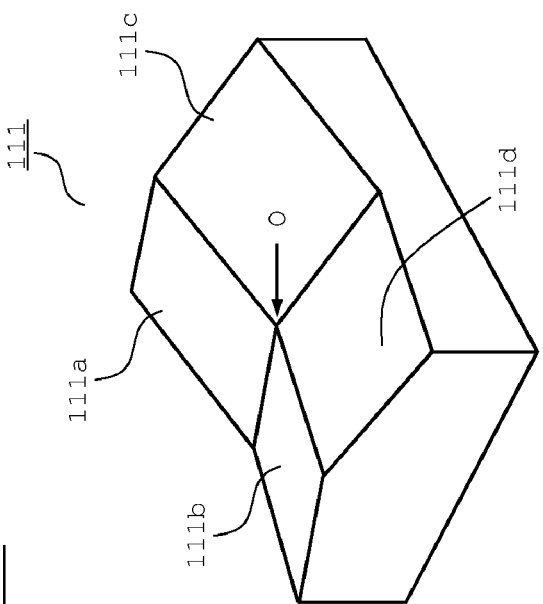
FIGS. 10A and 10B are diagrams showing an arrangement of a flat plate element in Example 1.
Figure 10B:
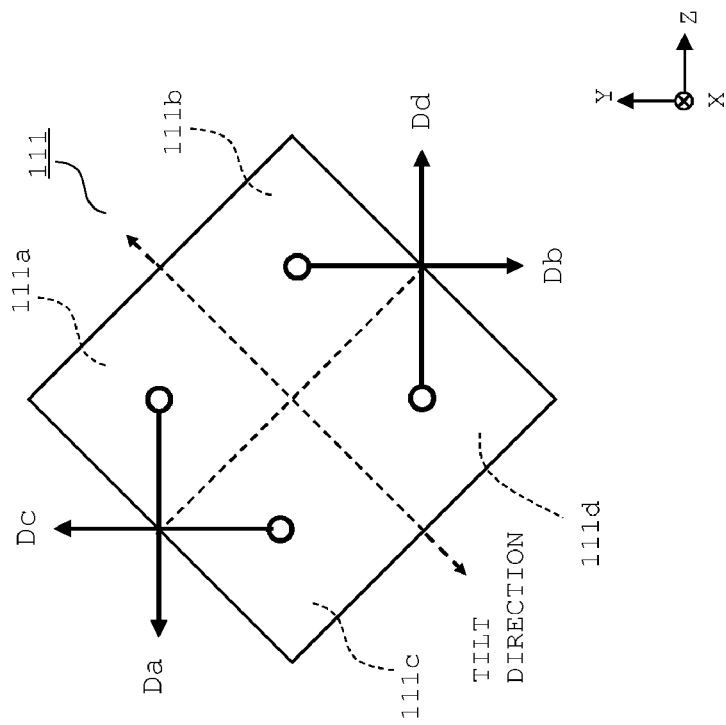

FIG. 10A is a perspective view of the flat plate element 111, and FIG. 10B is a diagram schematically showing that the propagating direction of laser light is changed by the flat plate element 111. FIG. 10B is a schematic diagram of the flat plate element 111, when viewed from the side of a light incidence surface of the flat plate element 111. In FIG. 10A, laser light reflected on the disc is entered into a flat surface on the backside of the flat plate element 111.

As shown in FIG. 10A, the flat plate element 111 is formed with four tilted surfaces 111a through 111d on the light exit surface thereof. The four tilted surfaces 111a through 111d are configured in such a manner that the propagating directions of light fluxes to be entered into the respective tilted surfaces 111a through 111d are aligned with directions of arrows Da through Dd shown in FIG. 10B, respectively, when the flat plate element 111 is disposed with an inclination as shown in FIG. 9A. The arrows Da through Dd shown in FIG. 10B correspond to the arrows Da through Dd shown in FIG. 7A.

In this example, the flat plate element 111 is disposed at such a position that the optical axis of laser light reflected on the disc passes a point (the center point O) at which the tilted surfaces 111a through 111d intersect with each other on the light exit surface of the flat plate element 111. In this arrangement, light fluxes in the light flux areas A through D shown in FIG. 7A are respectively entered into the tilted surfaces 111a through 111d for changing the propagating directions thereof. Accordingly, the light fluxes of reflected light (signal light, and stray light 1 and 2) to be entered into the flat plate element 111 are separated from each other on the plane S0, as shown in FIG. 7B, upon focusing of laser light on a targeted recording layer.

As described above, in the example, it is possible to prevent signal light reflected on a targeted recording layer of the recording layers formed in the disc, and stray light 1 and 2 reflected on a recording layer at a rearward position and a recording layer at a forward position with respect to the targeted recording layer from superimposing one over the other on a light receiving surface (the plane S0 where a spot of signal light is most approximated to a true circle in an on-focus state) of the photodetector 112. Specifically, it is possible to keep the distribution of signal light, and stray light 1 and 2 on the light receiving surface (the plane S0) to the state shown in FIG. 7B. Accordingly, disposing the sensing portions P11 through P18 shown in FIG. 8D on the signal light area shown in FIG. 7B enables to receive only the corresponding signal light on the sensing portions P11 through P18. This enables to suppress deterioration of a detection signal resulting from stray light.

Further, in the example, since it is possible to remove stray light by merely providing the flat plate element 111 having the tilted surfaces on the light exit surface thereof, it is possible to effectively suppress an influence of stray light, while simplifying the arrangement of the optical pickup device, and reducing the cost.

In the example, since there is no likelihood that stray light may be entered into the sensing portions of the photodetector, there is no need of providing a measure for reducing the light amount of stray light which may enter into the sensing portions by e.g. increasing the return path magnification of the optical system for expanding the irradiation area of stray light on the photodetector. Accordingly, in the example, there is no need of providing lens means for increasing the return path magnification such as an anamorphic lens, between the polarized beam splitter 102 and the photodetector 112, which contributes to simplifying the arrangement of the optical pickup device, and reducing the cost. Further, since there is no need of increasing the return path magnification, it is possible to dispose the photodetector 112 in proximity to the polarized beam splitter 102, which enables to miniaturize the optical pickup device.

In the example, the flat plate element 111 generates astigmatism and changes the propagating directions of the respective light fluxes of reflected light. Alternatively, generation of astigmatism and change of the propagating directions of the respective light fluxes of reflected light may be performed by individual optical elements. The modification enables to provide substantially the same stray light removal effect as the arrangement of the example, although the number of parts is increased.

Example 2

Figure 11A:
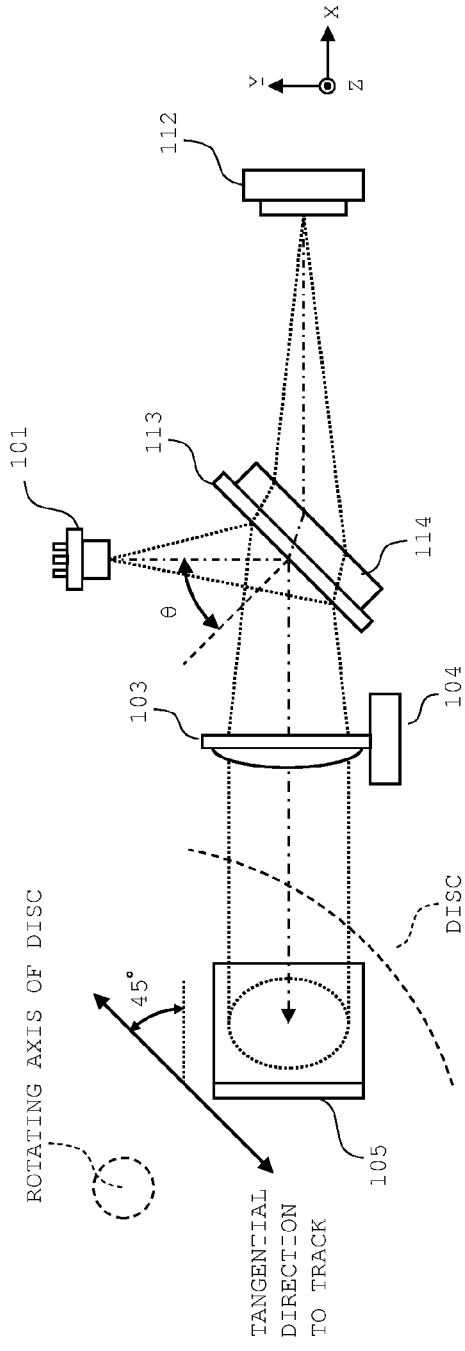
FIGS. 11A through 11C are diagrams showing an optical system of an optical pickup device as Example 2.
Figure 11C:
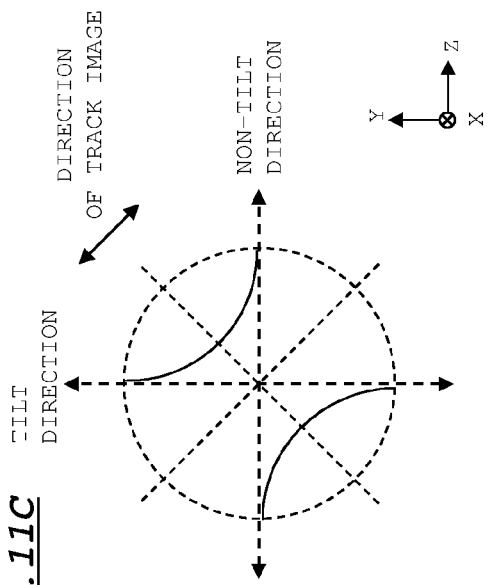
Figure 11B:
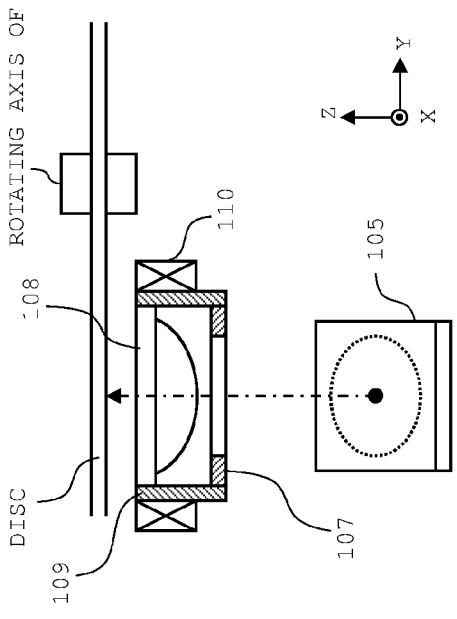

FIGS. 11A through 11C are diagrams showing an arrangement of an optical pickup device as Example 2. As shown in FIG. 11A, in the example, the polarized beam splitter 102 shown in Example 1 is omitted, and a half mirror 113 and a spectral element 114 are additionally provided. Further, the swing angle is set to 45°. Furthermore, as shown in FIG. 11B, in the example, the quarter wavelength plate 106 is not provided.

In the following, the elements in Example 2 different from those in Example 1 are described.

The half mirror 113 reflects and transmits laser light to be entered with a ratio of 50%. Accordingly, the half mirror 113 reflects laser light to be entered from a semiconductor laser 101 toward a collimator lens 103, and transmits laser light to be entered from the side of the collimator lens 103 in the plus X-axis direction. Further, the half mirror 113 is inclined in a direction in parallel to the X-Y plane with respect to the optical axis of reflected light. Accordingly, as shown in FIG. 11C, the tilt direction and the non-tilt direction are respectively aligned with the Y-axis direction and the Z-axis direction. Since the swing angle is set to 45°, the direction of a track image has an angle of 45° with respect to the tilt direction and the non-tilt direction.

The spectral element 114 is a flat planar transmission element, and is formed with four tilted surfaces having different angles from each other on a light exit surface thereof in the similar manner as the flat plate element 111 in Example 1. Further, a light incidence surface of the spectral element 114 is overlapped with a light exit surface of the half mirror 113.

When laser light is focused on a targeted recording layer in a state that the half mirror 113 and the spectral element 114 are arranged as described above, reflected light (signal light, and stray light 1 and 2) to be entered into the half mirror 113 from the side of the collimator lens 103 is separated on the plane S0, as shown in FIG. 7B. Specifically, astigmatism is imparted to reflected light by the half mirror 113 and the spectral element 114, and the propagating directions of light fluxes of reflected light passing the areas A through D obtained by dividing the laser light by straight lines in parallel to the tilt direction and the non-tilt direction are changed into directions Da through Dd by the tilted surfaces of the spectral element 114.

In disposing the half mirror 113 and the spectral element 114, first, the position of the half mirror 113 is adjusted so that laser light to be emitted from the semiconductor laser 101 is properly entered into an objective lens 108. Specifically, the angle θ defined by the optical axis of laser light to be emitted from the semiconductor laser 101, and a normal line to the half mirror 113 is adjusted. Subsequently, the position of the spectral element 114 is adjusted in a plane in contact with the half mirror 113 in such a manner that the optical axis of reflected light to be entered into the spectral element 114 passes the center point of the light exit surface of the spectral element 114, while aligning the light incidence surface of the spectral element 114 with the light exit surface of the half mirror 113.

Similarly to Example 1, Example 2 is advantageous in effectively removing stray light, while simplifying the arrangement of the optical pickup device.

In the arrangement shown in FIGS. 11A through 11C, the half mirror 113 and the spectral element 114 are provided independently of each other. Alternatively, the half mirror 113 may be provided with the function of the spectral element 114, and the spectral element 114 may be omitted. In the modification, for instance, four tilted surfaces having different angles from each other are formed on a light exit surface of the half mirror 113. The modification enables to reduce the number of parts and simplify the arrangement of the optical pickup device, as compared with the arrangement shown in FIGS. 11A through 11C.

Figure 12A:
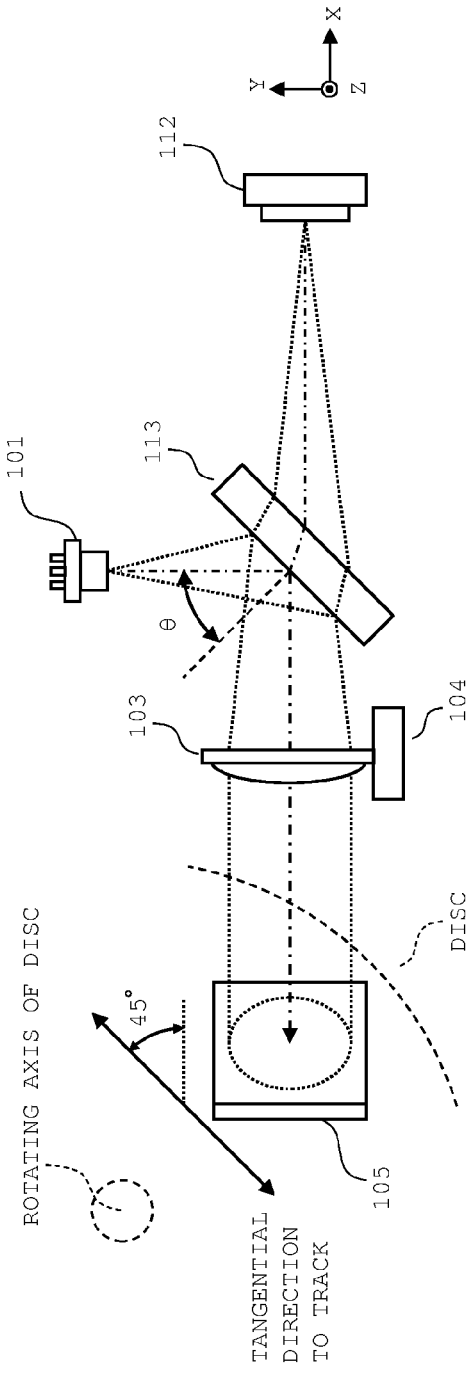
FIGS. 12A through 12C are diagrams showing a modification of the optical system of the optical pickup device as Example 2.
Figure 12C:
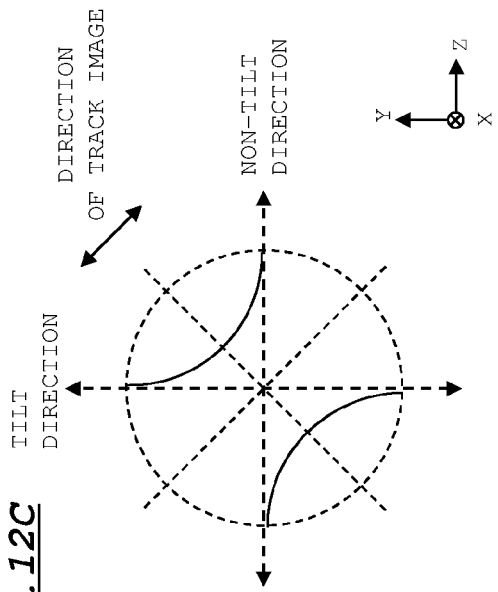
Figure 12B:
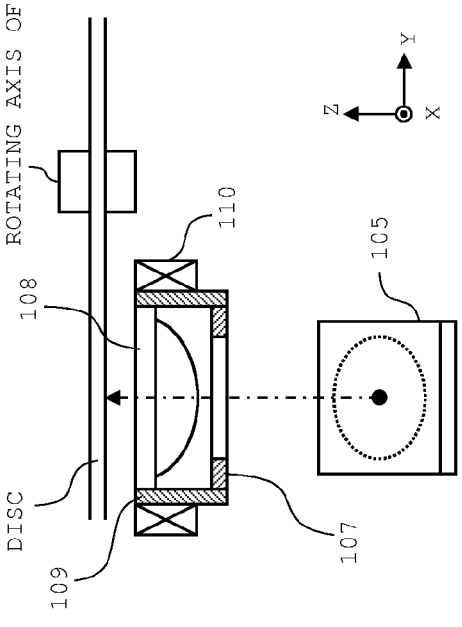

In the arrangement shown in FIGS. 12A through 12C, however, since the half mirror 113 and the spectral element 114 are integrally formed, it is impossible to individually adjust the optical system (from the semiconductor laser 101 to the objective lens 108) on the outward path, and the optical system (from the objective lens 108 to the photodetector 112) on the return path. In contrast, in the arrangement shown in FIGS. 11A through 11C, it is possible to set the optical system on the outward path, while adjusting the position of the half mirror 113, and then, set the optical system on the return path, while adjusting the position of the spectral element 114. Accordingly, in the arrangement shown in FIGS. 11A through 11C, the distribution state of the respective light fluxes of reflected light can be accurately set to the state as shown in FIG. 7B by adjusting the position of the spectral element 114, even if the return path magnification is set to a small value, and the spectral element 114 and the photodetector 112 are disposed proximal to each other. Further, in the arrangement shown in FIGS. 11A through 11C, since the half mirror 113 and the spectral element 114 are placed one over the other, it is possible to prevent the half mirror 113 from being deformed by heat.

In the arrangements shown in FIGS. 11A through 11C, and FIGS. 12A through 12C, coma aberration is generated by the half mirror 113 and the spectral element 114 disposed with an inclination with respect to the optical axis of reflected light. The coma aberration can be suppressed by a coma aberration correcting plate 115 shown in FIGS. 13A and 13B.

In FIGS. 13A and 13B, the coma aberration correcting plate 115 is a flat planar transmission element. The coma aberration correcting plate 115 is disposed with the same tilt angle as the tilt angle of the half mirror 113 which is rotated by 180° about the optical axis of reflected light. The thickness and the refractive index of the coma aberration correcting plate 115 are adjusted to cancel the coma aberration generated by the half mirror 113 and the spectral element 114. Thus, in the arrangement shown in FIG. 13A, coma aberration generated by the half mirror 113 and the spectral element 114 can be suppressed by the coma aberration correcting plate 115. Further, in the arrangement shown in FIG. 13B, coma aberration generated by the half mirror 113 can be suppressed by the coma aberration correcting plate 115.

The optical axis of reflected light to be entered into the photodetector 112, and a focal line position in the X-axis direction may be displaced due to the existence of the coma aberration correcting plate 115. In view of this, the thickness of the half mirror 113 or the spectral element 114, and the position of the photodetector on the Y-Z plane are corrected depending on the thickness of the coma aberration correcting plate 115, as necessary.

Example 3

FIGS. 14A and 14B are diagrams showing a modified example, wherein a part of the optical system of the optical pickup device described in Example 2 is modified. In FIGS. 14A and 14B, a diverging lens is additionally provided to the optical system shown in FIG. 11A and the optical system shown in FIG. 13A, respectively. The diverging lens in the example is an optical element having a concave-shaped light exit surface, and has a function of diverging laser light to be entered from a light incidence surface thereof.

Referring to FIGS. 14A and 14B, a diverging lens 116 is disposed between a semiconductor laser 101 and a half mirror 113. Laser light to be entered from the semiconductor laser 101 into the diverging lens 116 is diverged by the diverging lens 116. In view of this, the focal length of a collimator lens 103 is set to a small value, as compared with the arrangement in Example 2.

As compared with the arrangement in Example 2, the example is advantageous in reducing the return path magnification (a ratio of the focal length of a collimator lens with respect to the focal length of an objective lens). Therefore, it is possible to dispose a photodetector 112 at a position more proximal to the half mirror 113, as compared with the arrangement in Example 2. This is more advantageous in miniaturizing the optical pickup device.

Further, since the focal length of the collimator lens 103 is short in the example, as compared with the arrangement in Example 2, the convergence angle of reflected light to be entered into the half mirror 113 is set to a large value. As a result, the amount of astigmatism generated by the half mirror 113 and a spectral element 114 may be increased. In view of this, the thicknesses of the half mirror 113 and the spectral element 114 may be set to a small value.

FIGS. 14A and 14B show an arrangement, wherein the diverging lens 116 is additionally provided to the optical system shown in FIG. 11A and the optical system shown in 13A, respectively. It is possible to additionally provide the diverging lens 116 to the optical system shown in FIG. 12A and the optical system shown in FIG. 13B in the similar manner as described above.

Example 4

Figure 15A:
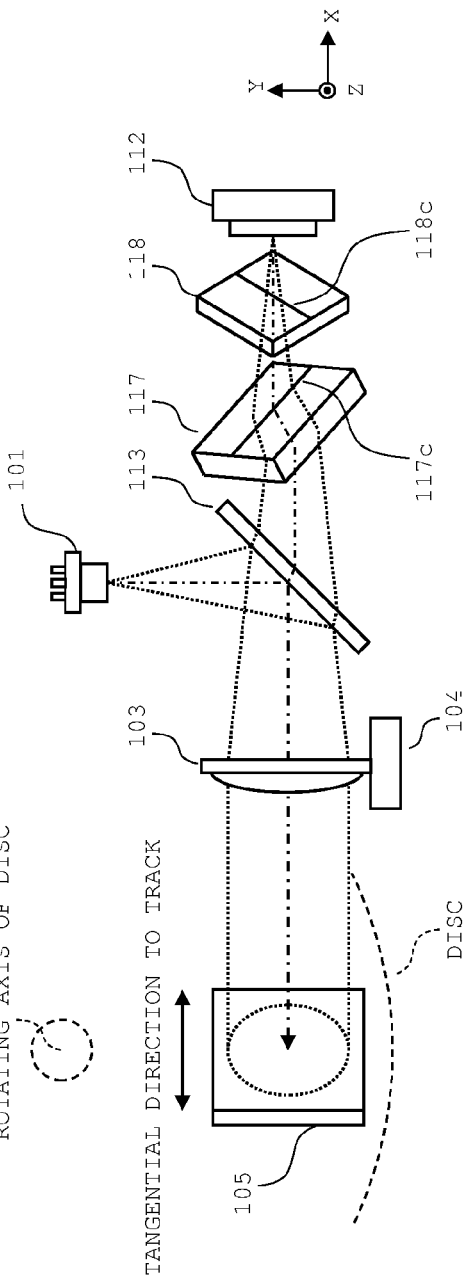
FIGS. 15A through 15C are diagrams showing an optical system of an optical pickup device as Example 4.
Figure 15C:
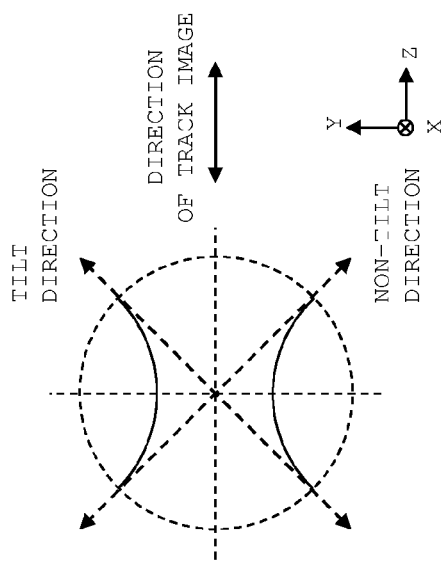
Figure 15B:
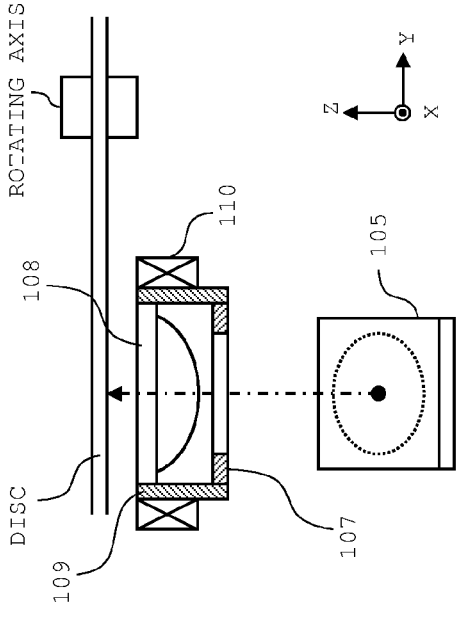

FIGS. 15A through 15C are diagrams showing an arrangement of an optical pickup device as Example 4. As shown in FIG. 15A, an optical system of the optical pickup device in the example is different from the optical system in Example 1 described referring to FIGS. 9A and 9B in that the polarized beam splitter 102, the quarter wavelength plate 106, and the flat plate element 111 are omitted, and a half mirror 113 and two-part prisms 117 and 118 are additionally provided.

Referring to FIG. 15A, the optical system in the example is configured in such a manner that astigmatism imparted to reflected light by the half mirror 113 is approximately cancelled by the two-part prism 118. Astigmatism with respect to reflected light is substantially imparted by the two-part prism 117. Further, the spectral function shown in FIG. 7A is performed by the two-part prisms 117 and 118.

The two-part prism 117, 118 is a flat planar transmission element, and is formed with two tilted surfaces having different angles from each other on a light exit surface thereof, which will be described later. As shown in FIG. 15C, the two-part prism 117 is disposed at such a position that a tilt direction and a non-tilt direction have an angle of 45° with respect to a direction of a track image of reflected light. The two-part prism 118 is disposed with an inclination in a direction in parallel to the X-Z plane with respect to the optical axis of reflected light.

The thickness, the refractive index, and the tilt angle of the two-part prism 118 are adjusted in such a manner that the astigmatism function by the half mirror 113 and the astigmatism function by the two-part prism 118 are approximately cancelled with each other. Accordingly, substantially only the astigmatism function by the two-part prism 117 remains.

Further, the tilt direction of the two-part prism 117 is aligned with such a direction as to simultaneously suppress coma aberration generated by the half mirror 113 and coma aberration generated by the two-part prism 118 by coma aberration generated by the two-part prism 117. The thickness, the refractive index, and the tilt angle of the two-part prism 118 are adjusted in such a manner that coma aberration generated by the half mirror 113 and coma aberration generated by the two-part prism 118 can be suppressed, and an intended astigmatism function can be performed. Composing the half mirror 113 and the two-part prisms 117 and 118 of a same material and with a same thickness, and setting the tilt angles of the half mirror 113 and the two-part prisms 117 and 118 with respect to the optical axis of reflected light to 45° enables to perform the astigmatism function by the two-part prism 117, while effectively canceling coma aberrations generated by the respective members at a low cost.

Figure 16B:
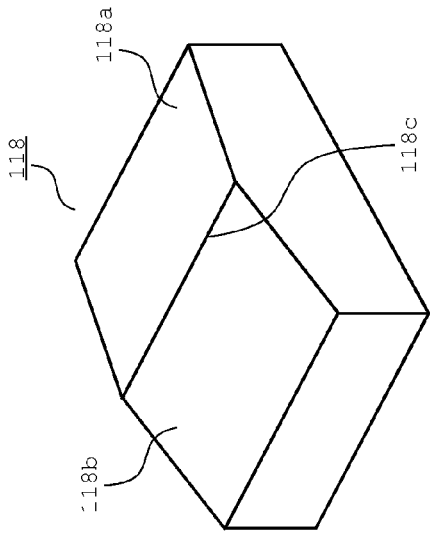
FIGS. 16A through 16E are diagrams showing arrangements of two-part prisms in Example 4.
Figure 16A:
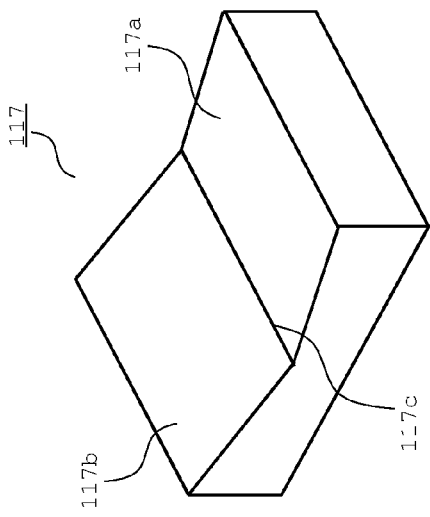
Figure 16E:
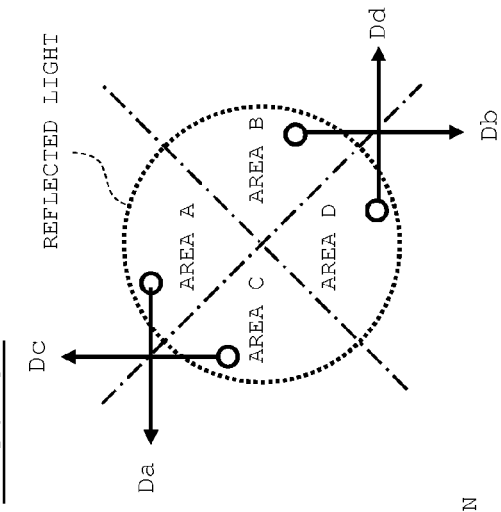
Figure 16D:
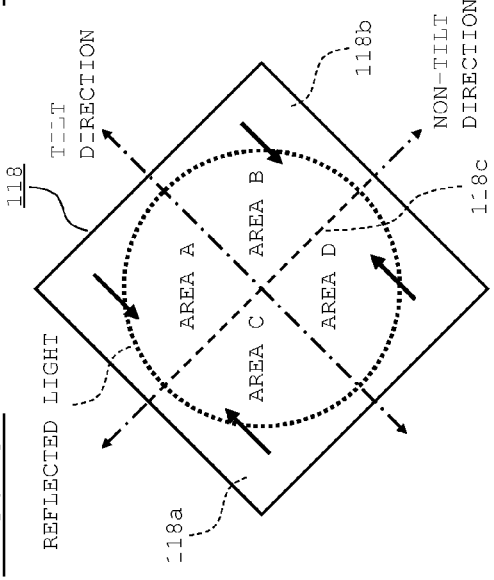
Figure 16C:
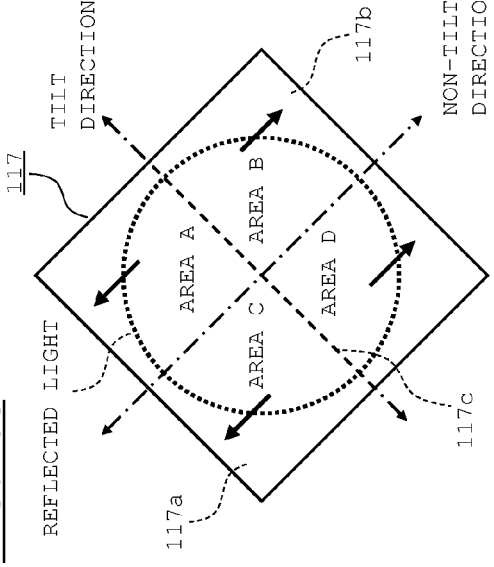

FIGS. 16A and 16B are perspective views of the two-part prisms 117 and 118, respectively, and FIGS. 16C and 16D are schematic diagrams respectively showing changes in the propagating direction of laser light by the two-part prisms 117 and 118. FIGS. 16C and 16D are schematic views of the two-part prisms 117 and 118 disposed in the state as shown in FIG. 15A, when viewed from the respective light incidence surfaces thereof. In FIGS. 16A and 16B, laser light reflected on the disc is entered from a flat surface on the backside of the two-part prisms 117 and 118, respectively.

As shown in FIG. 16A, the two-part prism 117 has two tilted surfaces 117a and 117b of a valley shape having different angles from each other on a light exit surface thereof. Further, as shown in FIG. 16B, the two-part prism 118 has two tilted surfaces 118a and 118b of a hill shape having different angles from each other on a light exit surface thereof.

An intersection line 117c of the tilted surfaces of the two-part prism 117 is aligned with the tilt direction shown in FIG. 15C with respect to a light flux of reflected light. Likewise, an intersection line 118c of the tilted surfaces of the two-part prism 118 is aligned with the non-tilt direction shown in FIG. 15C with respect to a light flux of reflected light.

As shown in FIGS. 16C and 16D, light fluxes in light flux areas A through D obtained by dividing reflected light to be entered into the two-part prism 117 into four by two straight lines in parallel to the tilt direction and the non-tilt direction are respectively entered into the tilted surfaces 117a and 117b of the two-part prism 117 and the tilted surfaces 118a and 118b of the two-part prism 118, as shown in FIGS. 16C and 16D. Accordingly, the propagating directions of the light fluxes in the light flux areas A through D are changed into the arrow directions shown in FIGS. 16C and 16D by the tilted surfaces 117a and 117b and the tilted surfaces 118a and 118b. Thus, the propagating directions of the light fluxes in the light flux areas A through D are changed into directions Da through Dd shown in FIG. 16E while the light fluxes pass the two-part prisms 117 and 118. In this example, the directions Da through Dd respectively correspond to the directions Da through Dd in FIG. 7A.

The tilted surfaces 117a and 117b of the two-part prism 117, and the tilted surfaces 118a and 118b of the two-part prism 118 are so configured as to change the propagating directions of the light fluxes in the light flux areas A through D into the directions Da through Dd shown in FIG. 16E. Thus, the propagating directions of light fluxes of reflected light passing the light flux areas A through D are changed by the tilted surfaces of the two-part prisms 117 and 118, with the result that the respective light fluxes of reflected light are separated from each other on the plane S0, as shown in FIG. 7B.

As described above, the example is advantageous in suppressing coma aberration in addition to the advantage described in Example 1, although the number of parts is increased, as compared with the arrangement in Example 1.

Alternatively, either one of the two-part prisms 117 and 118 may have a spectral function described referring to FIG. 16E. Specifically, as shown in FIG. 17A, four tilted surfaces having different angles from each other may be formed only on the two-part prism 117. Further alternatively, as shown in FIG. 17B, four tilted surfaces having different angles from each other may be formed only on the two-part prism 118. Further alternatively, the two tilted surfaces as shown in FIG. 16A and the two tilted surfaces as shown in FIG. 16B may be respectively formed on upper and lower surfaces of either one of the two-part prisms 117 and 118. Further alternatively, four tilted surfaces having different angles from each other may be formed on the light exit surface of the half mirror 113, or tilted surfaces having a spectral function as shown in FIG. 16E may be formed on the light exit surface of the half mirror 113, and the two-part prism 117 or 118.

Other Modifications

In the foregoing, Examples 1 through 4 of the invention are described. The invention is not limited to the foregoing examples, and the embodiment of the invention may be modified in various ways other than the above.

For instance, in the examples, a refractive function is imparted to separate light fluxes of reflected light from each other. Alternatively, a diffractive function may be imparted to separate light fluxes of reflected light from each other. For instance, a hologram having a diffraction pattern may be formed on the light exit surface of the flat plate element 111 shown in FIG. 9A, in place of forming tilted surfaces. Further alternatively, the light exit surface of the flat plate element 111 shown in FIG. 9A may be formed into a flat surface, and a hologram element for separating light fluxes by diffraction may be provided at a position posterior to the flat plate element 111.

Figure 18A:
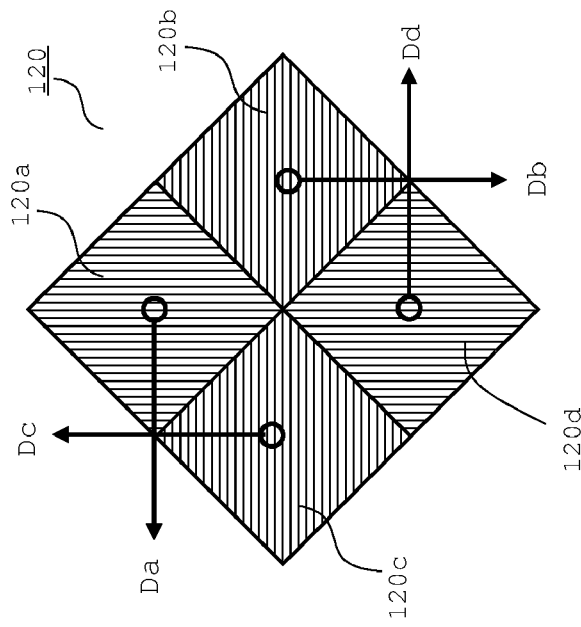
FIGS. 18A and 18B are diagrams showing modifications of the examples of the invention.

FIG. 18A is a diagram of a hologram element 120 having four different hologram areas 120a through 120d on a light exit surface thereof, when viewed from a light incidence surface thereof. As shown in FIG. 18A, the propagating directions of light fluxes of reflected light are changed by the hologram areas 120a through 120d of the hologram element 120. Accordingly, the light flux distribution as shown in FIG. 7B is obtained on the photodetector 112.

The spectral element 114 may be replaced by a hologram element, as necessary. Further alternatively, the two-part prisms 117 and 118 shown in FIGS. 15A, 17A, and 17B may be replaced by a parallel flat plate having hologram areas on a light exit surface thereof. The hologram to be formed on the hologram areas may have a stepped pattern or a blazed pattern.

In the embodiment, tilted surfaces are formed on the light exit surface of an element having a spectral function. Alternatively, tilted surfaces may be formed on the light incidence surfaces of the respective elements. For instance, in the arrangement shown in FIGS. 9A through 9C, four tilted surfaces having different angles from each other are formed on the light exit surface of the flat plate element 111. Alternatively, the tilted surfaces may be formed on the light incidence surface of the flat plate element 111. Further alternatively, the two tilted surfaces as shown in FIG. 16A and the two tilted surfaces as shown in FIG. 16B may be formed respectively on upper and lower surfaces of the flat plate element 111.

In the arrangements shown in FIGS. 15A through 15C, and FIGS. 17A and 17B, tilted surfaces having different angles from each other are formed on the light exit surfaces of the two-part prisms 117 and 118. Alternatively, the tilted surfaces may be formed on the light incidence surfaces of the two-part prisms 117 and 118.

In the example, the rise-up mirror 105 is used. Alternatively, the rise-up mirror 105 may be omitted.

Figure 18B:
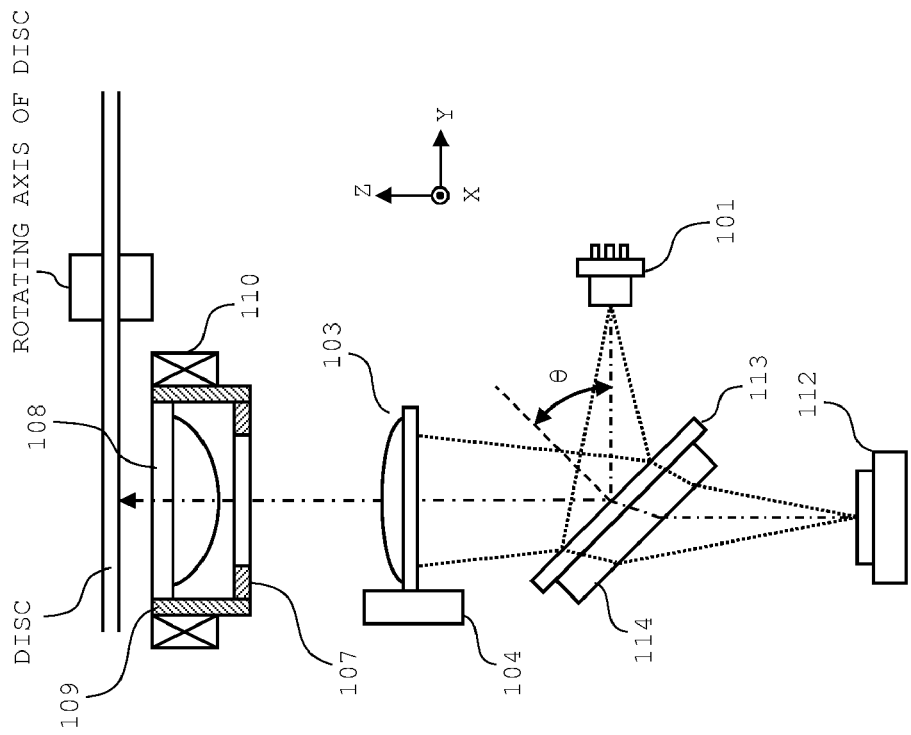

FIG. 18B is a diagram showing an optical system of an optical pickup device, wherein the rise-up mirror 105 in Example 2 described referring to FIGS. 11A and 11B is omitted. In FIG. 18B, the optical axis of laser light from a position where the laser light is emitted from a semiconductor laser 101 to a position where the laser light is entered into a half mirror 113 has an angle of 45° with respect to the tangential direction to a track at a laser light irradiation position on a disc.

In the above arrangement, since the swing angle can be set to 45° by merely rotating the semiconductor laser 101 and the half mirror 113 about the optical axis of an objective lens 108, the layout of the optical system can be easily configured. In the examples, since the photodetector 112 can be disposed proximal to the half mirror 113 as described above, there is no likelihood that the thickness of the optical pickup device may be unduly increased in the arrangement shown in FIG. 18B.

The embodiment of the invention may be changed or modified in various ways as necessary, as far as such changes and modifications do not depart from the scope of the claims of the invention hereinafter defined.

What is claimed is:

1. An optical pickup device comprising:
a laser light source;
an objective lens which converges laser light emitted from the laser light source on a recording medium;
a photodetector which receives the laser light reflected on the recording medium;
an optical system which guides the laser light to the photodetector as convergent light;
a light transmitting plate which is disposed between the optical system and the photodetector with an inclination with respect to an optical axis of the laser light to impart astigmatism to the laser light reflected on the recording medium; and
an optical element which separates four light fluxes of the laser light from each other, the four light fluxes being obtained by dividing the laser light by two straight lines respectively in parallel to a first focal line direction and a second focal line direction, the first focal line direction being a direction of a first focal line of the laser light, the second focal line direction being a direction of a second focal line of the laser light and orthogonal to the first focal line direction, the first focal line and the second focal line being generated by the astigmatism imparted by the light transmitting plate.

2. The optical pickup device according to claim 1, wherein the first focal line direction and the second focal line direction are inclined by 45 degrees with respect to a direction of a track image from the recording medium.

3. The optical pickup device according to claim 1, wherein the light transmitting plate and the optical element are integrally formed.

4. The optical pickup device according to claim 1, further comprising:
a correcting plate which suppresses coma aberration of the laser light to be guided to the photodetector is disposed with an inclination with respect to the optical axis of the laser light.

5. An optical pickup device comprising:
a laser light source;
an objective lens which converges laser light emitted from the laser light source on a recording medium;
a photodetector which receives the laser light reflected on the recording medium;
an optical system which guides the laser light to the photodetector as convergent light;
a plurality of light transmitting plates which are disposed between the optical system and the photodetector with an inclination with respect to an optical axis of the laser light to impart astigmatism to the laser light reflected on the recording medium; and a light flux separating section which separates four light fluxes of the laser light from each other, the four light fluxes being obtained by dividing the laser light by two straight lines respectively in parallel to a first focal line direction and a second focal line direction, the first focal line direction being a direction of a first focal line of the laser light, the second focal line direction being a direction of a second focal line of the laser light and orthogonal to the first focal line direction, the first focal line and the second focal line being generated by the astigmatism imparted by the light transmitting plates, wherein the light transmitting plates are disposed at such positions as to suppress coma aberration of the laser light.

6. The optical pickup device according to claim 5, wherein the light flux separating section is disposed at one of the light transmitting plates, or at two or more of the light transmitting plates.

* * * * *

UNITED STATES PATENT AND TRADEMARK OFFICE
CERTIFICATE OF CORRECTION

PATENT NO. : 8,159,907 B2
APPLICATION NO. : 12/821529
DATED : April 17, 2012
INVENTOR(S) : Kenji Nagatomi It is certified that error appears in the above-identified patent and that said Letters Patent is hereby corrected as shown below:

In the drawings, FIGS. 14A and 14B, the box between feature 116 and feature 113 in each of FIGS. 14A and 14B should be removed as shown:

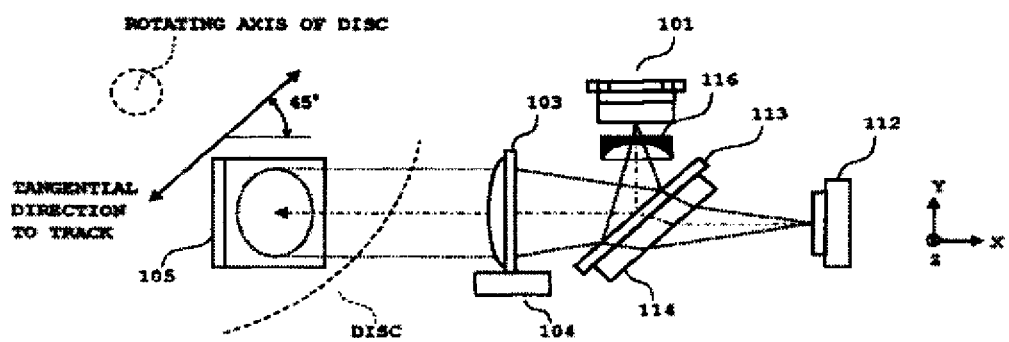

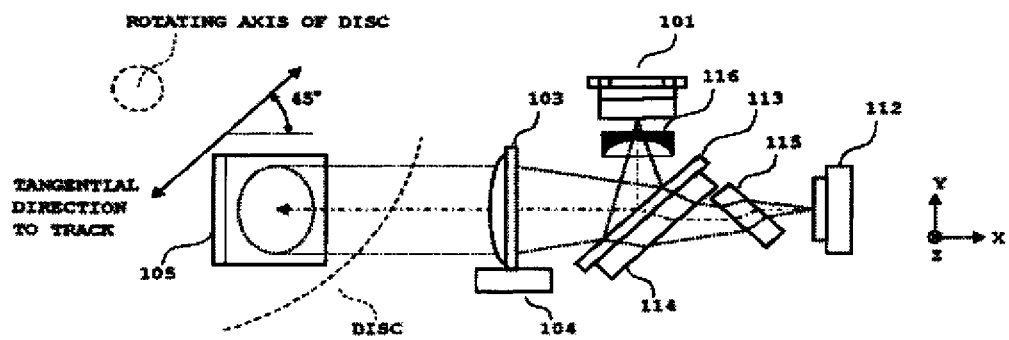

Signed and Sealed this
Fourth Day of December, 2012

David J. Kappos
*Director of the United States Patent and Trademark Office*

UNITED STATES PATENT AND TRADEMARK OFFICE
CERTIFICATE OF CORRECTION

Page 1 of 1

PATENT NO. : 8,159,907 B2
APPLICATION NO. : 12/821529
DATED : April 17, 2012
INVENTOR(S) : Kenji Nagatomi It is certified that error appears in the above-identified patent and that said Letters Patent is hereby corrected as shown below:

In the drawings, FIGS. 14A and 14B, the box between feature 116 and feature 113 in each of FIGS. 14A and 14B should be removed:

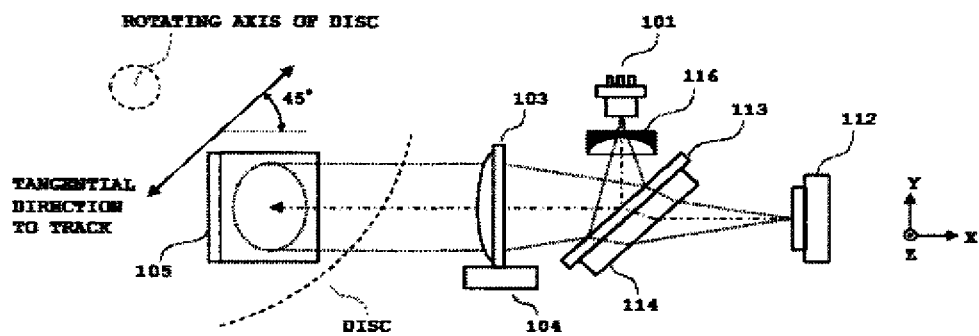

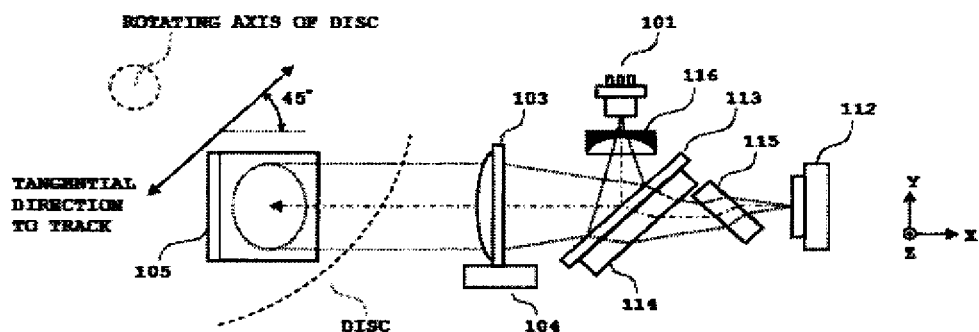

This certificate supersedes the Certificate of Correction issued December 4, 2012.

Signed and Sealed this
Eleventh Day of December, 2012

David J. Kappos
*Director of the United States Patent and Trademark Office*